US008718057B1

(12) United States Patent
Rabie et al.

(10) Patent No.: US 8,718,057 B1
(45) Date of Patent: *May 6, 2014

(54) ETHERNET LAN SERVICE ENHANCEMENTS

(75) Inventors: Sameh Rabie, Kanata (CA); Osama Aboul-Magd, Kanata (CA)

(73) Assignee: Nortel Networks Limited, Mississauga (CA)

(*) Notice: Subject to any disclaimer, the term of this patent is extended or adjusted under 35 U.S.C. 154(b) by 1778 days.

This patent is subject to a terminal disclaimer.

(21) Appl. No.: 11/024,692

(22) Filed: Dec. 30, 2004

Related U.S. Application Data

(60) Provisional application No. 60/537,487, filed on Jan. 20, 2004, provisional application No. 60/591,106, filed on Jul. 27, 2004.

(51) Int. Cl.
*H04L 12/28* (2006.01)

(52) U.S. Cl.
USPC ........... 370/390; 370/395.21; 370/432

(58) Field of Classification Search
USPC ........... 370/229, 254, 270, 351, 389–394, 370/395.21, 395.42–43, 395.53, 395.63, 370/400, 401, 432, 473; 709/223, 238, 244
See application file for complete search history.

(56) References Cited

U.S. PATENT DOCUMENTS

| | | | | |
|---|---|---|---|---|
| 5,983,260 A * | 11/1999 | Hauser et al. | ................ | 709/201 |
| 6,353,596 B1 * | 3/2002 | Grossglauser et al. | ....... | 370/256 |
| 6,400,725 B1 * | 6/2002 | Ross | ............................ | 370/445 |
| 6,463,068 B1 * | 10/2002 | Lin et al. | ....................... | 370/414 |
| 6,687,254 B1 * | 2/2004 | Ho et al. | ........................ | 370/412 |
| 6,826,158 B2 * | 11/2004 | Seaman et al. | ................ | 370/254 |
| 7,061,919 B1 * | 6/2006 | Anschutz | ................. | 370/395.43 |
| 7,092,389 B2 * | 8/2006 | Chase et al. | .................. | 370/389 |
| 7,184,440 B1 * | 2/2007 | Sterne et al. | ............. | 370/395.52 |
| 7,260,097 B2 * | 8/2007 | Casey | ........................... | 370/392 |
| 7,272,115 B2 * | 9/2007 | Maher et al. | ................... | 370/253 |
| 7,293,080 B1 * | 11/2007 | Clemm et al. | ................ | 709/223 |
| 2001/0047423 A1 * | 11/2001 | Shao et al. | ..................... | 709/235 |
| 2002/0038253 A1 * | 3/2002 | Seaman et al. | ................. | 705/26 |
| 2002/0097677 A1 * | 7/2002 | Hoar et al. | ..................... | 370/230 |
| 2002/0101820 A1 * | 8/2002 | Gupta et al. | .................. | 370/229 |
| 2003/0086425 A1 * | 5/2003 | Bearden et al. | ............... | 370/392 |
| 2003/0112755 A1 * | 6/2003 | McDysan | ...................... | 370/230 |
| 2003/0174706 A1 * | 9/2003 | Shankar et al. | ............... | 370/393 |
| 2003/0185217 A1 * | 10/2003 | Ganti et al. | ................ | 370/395.5 |
| 2004/0133619 A1 * | 7/2004 | Zelig et al. | .................... | 709/200 |
| 2004/0165600 A1 * | 8/2004 | Lee | ........................... | 370/395.53 |

(Continued)

OTHER PUBLICATIONS

Kompella, K. and Rekhter, Y., "Virtual Private LAN Services", IETF Internet Draft, draft-ietf-l2vpn-vpls-bgp-02.txt, May 2004.

(Continued)

*Primary Examiner* — Edan Orgad
*Assistant Examiner* — Curtis A Alia
(74) *Attorney, Agent, or Firm* — Ridout & Maybee LLP

(57) ABSTRACT

Numerous enhancements to metro Ethernet network (MEN) ELAN services and IETF Virtual Private LAN Service (VPLS) include an enhancement of the overall Quality of Service (QoS) architecture, an enhancement to classification at the provider edge, the use of Ethernet QoS classes, enhancements to policing and marking at ingress provider edge equipment, the provision of traffic management functions at egress provider edge equipment, the use of multiple Ethernet virtual connections (EVCs) and Aggregate EVCs, an enhancement to QoS across an external network-network interface and an enhancement to treatment of Ethernet service frames in a core network.

20 Claims, 14 Drawing Sheets

(56) References Cited

U.S. PATENT DOCUMENTS

| | | | |
|---|---|---|---|
| 2004/0174887 A1* | 9/2004 | Lee | 370/395.53 |
| 2005/0044262 A1* | 2/2005 | Luo | 709/238 |
| 2005/0132088 A1* | 6/2005 | Sridhar et al. | 709/249 |
| 2006/0088036 A1* | 4/2006 | De Prezzo | 370/395.53 |
| 2007/0201375 A1* | 8/2007 | Hallinan et al. | 370/252 |

OTHER PUBLICATIONS

Andersson, L., Framework for Layer 2 Virtual Private Networks (L2VPNs), IETF Internet Draft, draft-ietf-l2vpn-l2-framework-05.txt, Jun. 2004.

Lasserre, M. and Kompella V., "Virtual Private LAN Services over MPLS", IETF Internet Draft, draft-ietf-l2vpn-vpls-ldp-03.txt, Apr. 2004.

Martini, L. and Rosen, E. C., "Encapsulation Methods for Transport of Ethernet Frames over IP/MPLS Networks", IETF Internet Draft, draft-ietf-pwe3-ethernet-encap-07.txt.

The Metro Ethernet Forum, Technical Specification MEF 5: Traffic Management Specification: Phase 1, The Metro Ethernet Forum 2004.

* cited by examiner

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 2 |
| GOLD | E-AF42 | E-AF4 | 4 | 2 |
| SILVER | E-AF31 | E-AF3 | 3 | 3 |
| SILVER | E-AF32 | E-AF3 | 3 | 3 |
| BRONZE | E-AF21 | E-AF2 | 2 | 4 |
| BRONZE | E-AF22 | E-AF2 | 2 | 4 |
| BEST EFFORT | E-DF | E-DF | 1 | 5 |

FIG. 3

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 1 |
| GOLD | E-AF42 | E-AF4 | 4 | 1 |
| SILVER | E-AF31 | E-AF3 | 3 | 2 |
| SILVER | E-AF32 | E-AF3 | 3 | 2 |
| BRONZE | E-AF21 | E-AF2 | 2 | 2 |
| BRONZE | E-AF22 | E-AF2 | 2 | 2 |
| BEST EFFORT | E-DF | E-DF | 1 | 3 |

FIG. 4

| SERVICE CLASS | E-PHB | E-PSC | FORWARDING TREATMENT | BANDWIDTH PROFILE-ID |
|---|---|---|---|---|
| PLATINUM | E-EF | E-EF | 5 | 1 |
| GOLD | E-AF41 | E-AF4 | 4 | 1 |
| GOLD | E-AF42 | E-AF4 | 4 | 1 |
| SILVER | E-AF31 | E-AF3 | 3 | 1 |
| SILVER | E-AF32 | E-AF3 | 3 | 1 |
| BRONZE | E-AF21 | E-AF2 | 2 | 1 |
| BRONZE | E-AF22 | E-AF2 | 2 | 1 |
| BEST EFFORT | E-DF | E-DF | 1 | 1 |

FIG. 5

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| VARIABLE RATE (REAL-TIME) | • LOW FRAME DELAY, FRAME DELAY VARIATION AND FRAME LOSS<br>• VARIABLE RATE VOICE, VIDEO CONFERENCING, GAMING | CIR > 0<br>CBS > 0<br>EIR > 0<br>EBS > 0 | • ADMIT NON-CONFORMANT FRAMES UP TO EIR<br>• EXCESS FRAMES ARE ASSIGNED HIGH DROP PRECEDENCE | • MINIMUM BANDWIDTH ASSURANCE<br>• SUPPORT DELAY BOUNDS<br>• DROP EXCESS FRAMES FIRST WHEN CONGESTED<br>• EXAMPLE E-PHB = E-AF4 |

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| VARIABLE RATE (NON-REAL-TIME) | • LOW FRAME LOSS<br>• ENTERPRISE APPLICATIONS | CIR > 0<br>CBS > 0<br>EIR > 0<br>EBS > 0 | • ADMIT NON-COMPLIANT FRAMES UP TO EIR<br>• EXCESS FRAMES ARE ASSIGNED HIGH DROP PRECEDENCE | • MINIMUM BANDWIDTH ASSURANCE<br>• NO DELAY BOUND<br>• DROP EXCESS FRAMES FIRST WHEN CONGESTED<br>• EXAMPLE E-PHB = E-AF2 |

| ETHERNET QOS CLASS | PERFORMANCE TARGETS & APPLICATION EXAMPLES | TRAFFIC PARAMETERS | COMPLIANCE RULES | FORWARDING CLASS |
|---|---|---|---|---|
| BEST EFFORT | • NO HARD QOS GUARANTEES<br>• WEB SURFING, E-MAIL, BULK TRANSFER | CIR = 0<br>CBS = 0<br>EIR > 0 (POSSIBLY EQUAL PHYSICAL RATE)<br>EBS > 0 (LARGE) | • ALL FRAMES ARE ADMITTED WITH HIGH DROP PRECEDENCE | • SMALL BANDWIDTH ASSURANCES<br>• NO DELAY BOUND<br>• DROP FIRST WHEN CONGESTED<br>• EXAMPLE E-PHB = E-DF |

FIG. 9

ETHERNET LAN SERVICE ENHANCEMENTS

CROSS REFERENCE TO RELATED APPLICATIONS

The present application claims the benefit of prior provisional application Ser. No. 60/537,487, filed Jan. 20, 2004, and prior provisional application Ser. No. 60/591,106, filed Jul. 27, 2004, each of which is hereby incorporated herein by reference in their entirety.

FIELD OF THE INVENTION

The present invention relates to Ethernet Virtual Local Area Network (VLAN) services and, more particularly, to enhancements to the handling of Ethernet service frames within Ethernet VLANs.

BACKGROUND

A provider of data communications services typically provides a customer access to a large data communication network. This access is provided at "edge equipment" that connects a customer network to the large data communication network. As such, service providers have a broad range of customers with a broad range of needs, the service providers prefer to charge for their services in a manner consistent with which the services are being used. Such an arrangement also benefits the customer. To this end, a Service Level Agreement (SLA) is typically negotiated between customer and service provider. An SLA is a contract between the customer and service provider specifying agreed-to service level commitments. A Service Level Specification is a technical specification of the service being offered by the service provider to the customer.

To provide predetermined levels of service to a given customer, a service provider may consider monitoring and controlling the traffic from the given customer. Such monitoring and controlling is often referred to as "traffic management".

Traditionally, Ethernet networks have had no traffic management capabilities. The Ethernet standard, known as IEEE 802.3, specifies the use of a PAUSE frame that allows a client to request a pause in transmission from a terminal attached to a given port. However, the PAUSE frame may only be employed on per port basis and may only be employed with respect to directly attached devices, which are not necessarily the originators of the traffic requiring management.

Recently, the Institute of Electrical and Electronics Engineers (IEEE) introduced a user priority indication capability that enables the definition of up to eight service classes, also known as Classes of Service (CoS). A set of Ethernet frames that have the same user priority indication may receive the same level of performance within the service provider's network, where level of performance is usually measured in terms of frame loss ratio, frame delay and frame delay variation.

A standard known as IEEE 802.1Q defines an architecture for a general purpose Virtual Local Area Network (VLAN) that may be implemented within a customer network and describes a four-byte extension to Ethernet service frame headers known as an IEEE 802.1Q tag. This tag includes a number of fields, including a 12-bit VLAN-ID field and a three-bit "user priority" field used to signal compliant devices. These three bits (normally referred to as the "p-bits") provide for eight possible values, which match those used in the known IEEE 802.1p user priority field. The p-bits and VLAN-ID may be used in an IEEE 802.1Q tag to provide an identity of a CoS and, therefore, may be said to represent a VLAN CoS ID.

To allow the deployment of Ethernet to carrier (e.g., service provider) networks, the Metro Ethernet Forum (MEF) has recently been active in specifying traffic management capabilities for a metro Ethernet network (MEN). See MEF Technical Specification "Ethernet Service Model, Phase 1" available from www.metroethernetforum.org and hereby incorporated herein by reference. The work includes specifying Ethernet traffic parameters and traffic conditioning (policing) algorithms and actions. The MEF traffic parameters include: committed information rate (CIR), excess information rate (EIR), committed burst size (CBS), excess burst size (EBS). The traffic conditioning algorithms and actions relate to how Ethernet service frames are handled when they are found to comply with the traffic measurement parameters and when they are found not to comply with the traffic measurement parameters.

A single Ethernet VLAN has a capability to support the transmission of Ethernet service frames requiring different classes of service (up to eight). This capability differentiates Ethernet VLANs from connections defined by other technologies such as Frame Relay (FR) or Asynchronous Transfer Mode (ATM).

The MEF has defined basic traffic management at the User-Network Interface (UNI). The UNI may be defined as the physical demarcation point between the responsibility of a service provider and the responsibility of a customer. The service provider may provide one or more connections, each known as an Ethernet Virtual Connection (EVC), through the MEN. An EVC may be considered an instance of an association of two or more UNIs. Notably, it is known that a given UNI can support more than one EVC through the use of a Service Multiplexing capability.

As specified in "Ethernet Service Model, Phase 1" an Ethernet service frame is defined as any Ethernet frame that conforms to an IEEE 802.3 approved standard and is transmitted across a UNI.

The MEF provides a definition of traffic management over a point-to-point EVC. As part of that definition, first provider edge equipment (PE) in a MEN may receive an Ethernet service frame from customer edge equipment (CE) in a customer network. The Ethernet service frame may be received over a first UNI. The provider and customer edge equipment may be switches, routers, switch/routers, or similar devices performing Ethernet transport/switching functions. The first PE then identifies the EVC to which the service frame belongs (i.e., the PE determines an Ethernet Virtual Connection Identifier, or "EVC-ID") and sends the service frame to a second PE in the MEN, where the second PE is connected to a customer network via a second UNI. Notably, the second UNI is associated with the first UNI in the EVC. Identification of the EVC is defined as involving determining a VLAN identifier (VLAN-ID) from the IEEE 802.1 Q tag on the service frame, or from the Ethernet port identifier. A map may then be consulted to determine the identity of an EVC corresponding to the determined VLAN-ID. The sending of the Ethernet service frame to the PE connected to the UNI that is associated with the first UNI in the EVC may be accomplished in many ways, as the MEN may be implemented using a protocol of the choice of the service provider. Popular choices for MEN protocol include Ethernet, ATM, Multi-Protocol Label Switching (MPLS), FR, Internet Protocol (IP) and Synchronous Optical Network/Synchronous Digital Hierarchy (SONET/SDH).

To further coordinate MEF traffic management, the MEF has defined a term "Class of Service Identifier", or CoS-ID, for information derivable from an Ethernet service frame that allows the identification of a required Class of Service treatment of the Ethernet service frame. Continuing the example presented hereinbefore, the MEF has described the derivation of the CoS-ID from the EVC-ID alone or from the EVC-ID in combination with the p-bits from the user priority field of the IEEE 802.1Q tag.

The MEF recommends determining a CoS to associate with a received Ethernet service frame based, at least in part, on the VLAN CoS-ID. In particular, the VLAN CoS-ID may be used to determine CoS aspects such as a Bandwidth Profile and forwarding treatment. A Bandwidth Profile may used to specify the traffic parameters (e.g., CIR, CBS, EIR, EBS) that may be used for traffic policing and resource reservation.

An Ethernet LAN Service (E-LAN) is an Ethernet Service that is based upon a Multipoint-to-Multipoint EVC. From Section 6.1.2 of "Ethernet Service Model, Phase 1": "In a Multipoint-to-Multipoint EVC, two or more UNIs must be associated with one another. An ingress Service Frame to the EVC at one of the UNIs must not result in an egress Service Frame at a UNI that is not in the EVC. The rules under which a frame is delivered to a UNI in the EVC are specific to the particular service definition. Typically, a single broadcast or multi-cast ingress Service Frame (as determined from the destination MAC address) at a given UNI would be replicated in the Metro Ethernet Network and a single copy would be delivered to each of the other UNIs in the EVC. This kind of delivery would also typically apply to a Service Frame for which the MEN has not yet learned an association of the destination MAC address with an EVC, UNI pair."

While Ethernet Line (E-Line) Services, based upon point-to-point EVCs, may be used to create Private Line Services and Point-to-Point Virtual Private Networks (VPNs), E-LAN Services, based upon Multipoint-to-Multipoint EVCs, may be used to create Multipoint VPNs. In particular, Ethernet LAN Services may provide: intra-company connectivity; full transparency of control protocol service frames; and broadcast and multicast of individual service frames. New VLANs may be added without complex coordination between the customer network and the service provider network and may require only one connection to have multi-site connectivity.

The MEF E-LAN model is similar to a Virtual Private LAN Service (VPLS) in most aspects. According to Kompella, K., et al., "Virtual Private LAN Service" Internet Engineering Task Force (IETF) Internet Draft, May 2004, which may be found as draft-ietf-l2vpn-vpls-bgp-02.txt at www.ietf.org, a VPLS, also known as Transparent LAN Service, and Virtual Private Switched Network service, is a useful Service Provider offering. The service offered is a Layer 2 (of the well-known seven Open System Interconnect layers) VPN; however, in the case of VPLS, the customers in the VPN are connected by a multi-point network, in contrast to the usual Layer 2 VPNs, which are point-to-point in nature. The document describes the functions needed to offer VPLS, and goes on to describe a mechanism for signaling a VPLS, as well as a mechanism for transport of VPLS frames over tunnels across a packet switched network. The signaling mechanism uses the known Border Gateway Protocol as the control plane protocol.

In essence, a VPLS glues several individual LANs across a packet-switched network to appear and function as a single LAN (see Andersson, L., and Rosen, E., "Framework for Layer 2 Virtual Private Networks (L2VPNs)", IETF Internet Draft, June 2004, which may be found as draft-ietf-l2vpn-l2-framework-05.txt at www.ietf.org).

Alternative approaches include: those approaches which allow one to build a Layer 2 VPN with Ethernet as the interconnect; and those approaches which allow one to set up an Ethernet connection across a packet-switched network (see Martini, L., et al, "Encapsulation Methods for Transport of Ethernet Frames Over IP/MPLS Networks", IETF Internet Draft, July 2004, which may be found as draft-ietf-pwe3-ethernet-encap-07.txt at www.ietf.org). Both of these approaches, however, offer point-to-point Ethernet services. What distinguishes VPLS from the above two is that a VPLS offers a multi-point service. A mechanism for setting up Pseudo Wires for VPLS using the Label Distribution Protocol (LDP) is defined in Kompella, V., et al, "Virtual Private LAN Services over MPLS", IETF Internet Draft, April 2004, which may be found as draft-ietf-ppvpn-vpls-ldp-03.txt at www.ietf.org.

The IETF Internet Drafts describe UNI network functions and core (provider) network functions (unlike the MEF specifications, which focus on the UNI). Often, the VPLS core is specified as IP/MPLS network using Pseudo Wires. The VPLS model allows for different Attachment Circuit (AC) network technologies and access network technologies such as Ethernet, ATM and FR. The Attachment Circuit is terminated at the adjacent provider edge equipment.

In reviewing the MEF E-LAN and VPLS definitions, it may be considered that, although the disclosed basic traffic management techniques are useful, several enhancements may be implemented to improve the experience of both the customer and the provider.

SUMMARY

Suggested enhancements to MEN E-LAN services and VPLS include an enhancement of the overall Quality of Service (QoS) architecture, an enhancement to classification at the provider edge, the use of Ethernet service classes and QoS classes, enhancements to policing and marking at an ingress provider edge equipment, the provision of traffic management functions at an egress PE, the use of multiple Ethernet virtual connections (EVCs) and Aggregate EVCs, an enhancement to QoS across an external network-network interface and an enhancement to treatment of Ethernet service frames in a core network.

In accordance with an aspect of the present invention there is provided a traffic management system for a provider edge node in a provider network operating according to a Local Area Network Service. The traffic management system includes a classifier operable to determine a service class for a received Ethernet service frame, a marker operable to, based on an indication of the service class, select a forwarding treatment and associate the forwarding treatment with the received Ethernet service frame and a forwarder operable to transmit the received Ethernet service frame, over a multi-point-to-multipoint Ethernet Virtual Connection, to a node in the provider network.

In accordance with another aspect of the present invention there is provided a traffic management method including determining a service class for a received Ethernet service frame, selecting, based on an indication of the service class, a forwarding treatment, associating the forwarding treatment with the received Ethernet service frame and transmitting the received Ethernet service frame, over a multipoint-to-multipoint Ethernet Virtual Connection.

In accordance with a further aspect of the present invention there is provided a traffic management method for execution at a provider edge apparatus, the provider edge apparatus associated with a plurality of User-to-Network Interfaces.

The method includes receiving an Ethernet service frame over a given User-to-Network Interface among the plurality of User-to-Network Interfaces, determining an identity of a multipoint-to-multipoint Ethernet Virtual Connection to associate with the Ethernet service frame, determining, based on the identity of the multipoint-to-multipoint Ethernet virtual connection, an identity of a Bandwidth Profile to associate with the Ethernet service frame, determining compliance of the Ethernet service frame to the Bandwidth Profile and indicating the compliance of the Ethernet service frame to the Bandwidth Profile.

In accordance with a still further aspect of the present invention there is provided a method of performing network interworking functions at a provider edge apparatus in a core network. The method includes receiving a protocol data unit that encapsulates an Ethernet service frame, where the protocol data unit is specific to a protocol used in an access network, extracting the Ethernet service frame from the protocol data unit, determining an estimate of bandwidth required in the core network by a Local Area Network Service associated with the Ethernet service frame and establishing a tunnel in the core network, where the establishing is based, at least in part, on the estimate.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3 illustrates a first exemplary service class map according to an embodiment of the present invention;

FIG. 4 illustrates a second exemplary service class map according to an embodiment of the present invention;

FIG. 5 illustrates a third exemplary service class map according to an embodiment of the present invention;

FIG. 7 illustrates a definition for a "Variable Rate (Real-Time)" QoS class according to an embodiment of the present invention;

FIG. 8 illustrates a definition for a "Variable Rate (Non-Real-Time)" QoS class according to an embodiment of the present invention;

FIG. 9 illustrates a definition for a "Best Effort" QoS class according to an embodiment of the present invention;

DETAILED DESCRIPTION

Figure 1:
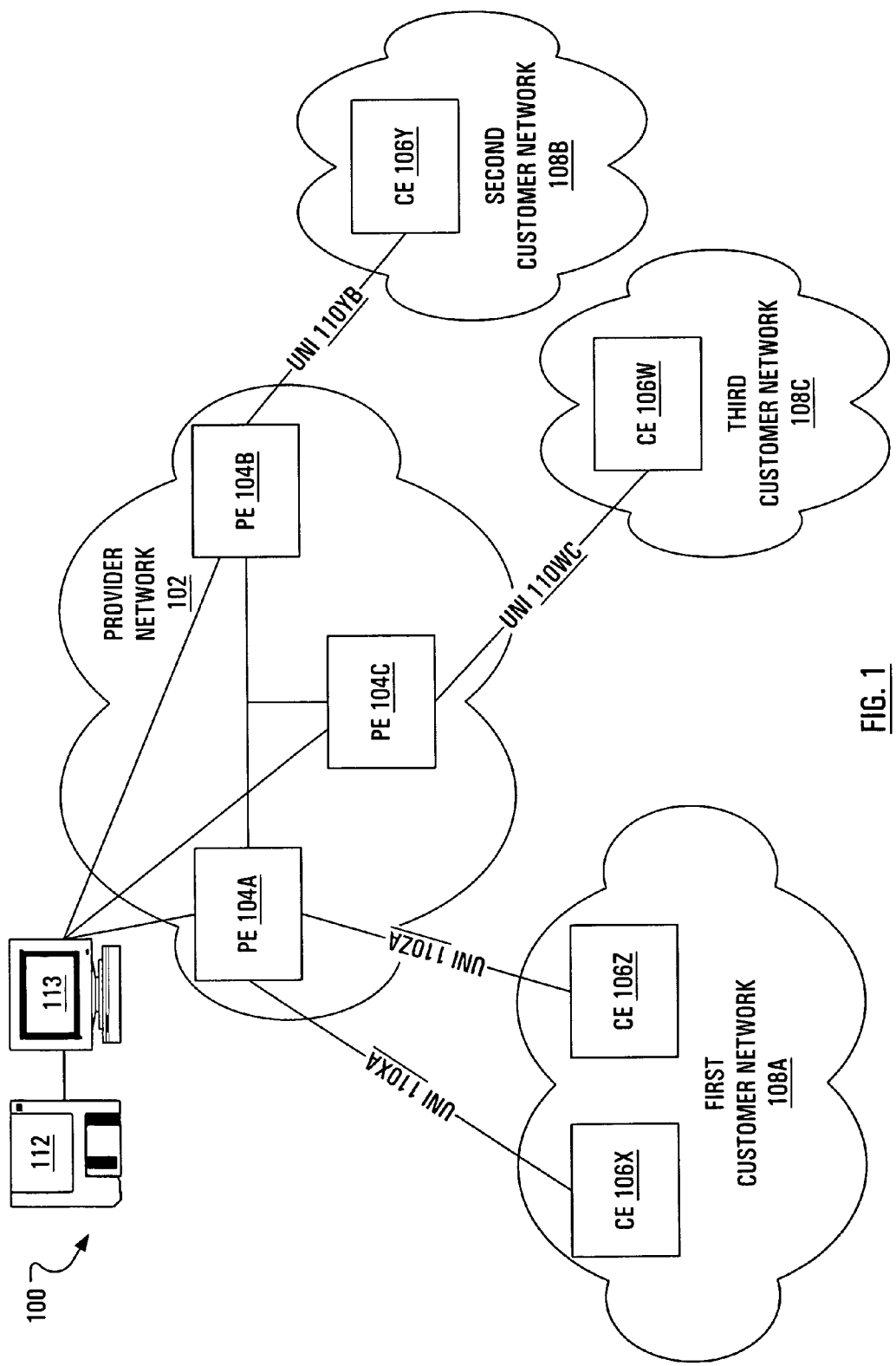
FIG. 1 illustrates an exemplary network including a provider network and several customer sites.

FIG. 1 illustrates an exemplary network 100 including a provider network 102 and three, of potentially many, customer networks. The customer networks are named, as a first customer network 108A, a second customer network 108B and a third customer network 108C. The provider network 102 may include multiple PEs including a first provider edge (PE) 104A, a second PE 104B and a third PE 104C (collectively or individually 104). The first customer network 108A includes a first customer edge (CE) 106X and a fourth CE 106Z, while the second customer network 108B includes a second CE 106Y and the third customer network 108C includes a third CE 106W. The CEs 106W, 106X, 106Y, 106Z may be collectively or individually referred to as 106.

It has been discussed hereinbefore that a User-Network Interface (UNI) may be defined as the physical demarcation point between the responsibility of a service provider and the responsibility of a customer. In the network 100 of FIG. 1, a first UNI 110XA is illustrated connecting the first CE 106X to the first PE 104A. Additionally, a second UNI 110YB is illustrated connecting the second CE 106Y to the second PE 104B, a third UNI 110WC is illustrated connecting the third CE 106W to the third PE 104C and a fourth UNI 110ZA is illustrated connecting the fourth CE 106Z to the first PE 104A.

The PEs 104 may be loaded with a traffic management profile for executing methods exemplary of this invention. The traffic management profile (software and/or configuration parameters) may be downloaded from network management system (NMS) 113. The NMS 113, in turn, may be loaded with traffic management profiles for transferring to the PEs 104 from a software medium 112 which could be a disk, a tape, a chip or a random access memory containing a file downloaded from a remote source. As will be apparent to a person of ordinary skill however, traffic management exemplary of this invention may be implemented in hardware, firmware or combinations of hardware, firmware and software. For instance, aspects of the invention may be implemented using a network processing unit or field programmable gate arrays (FPGAs).

For the purposes of this document, a Metro Ethernet Network may be considered to include the provider network 102 (including the PEs 104) and the CEs 106.

Figure 2:
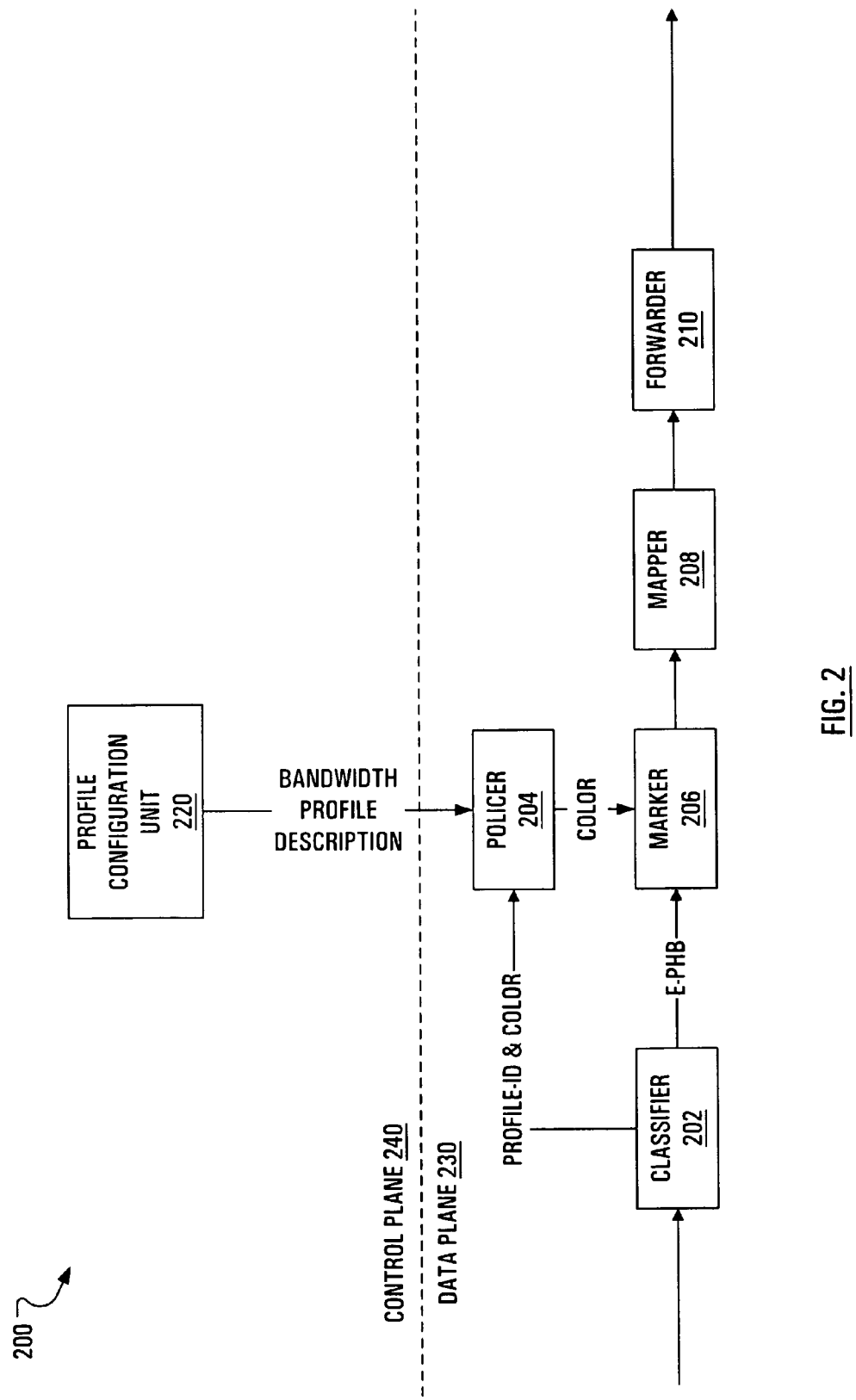
FIG. 2 illustrates a logical architecture for an ingress traffic management system for provider edge equipment in the provider network of FIG. 1.

FIG. 2 illustrates an ingress traffic management system 200 for use in any of the PEs 104. The ingress traffic management system 200 is illustrated as divided into a control plane 240 and a data plane 230. The data plane 230 includes a classifier 202, a policer 204, a marker 206, a mapper 208 and a forwarder 210. The control plane 240 includes a policing configuration unit 220. The control plane 240 may also include further configuration units (not shown) related to functions of other elements of the data plane 230. Such further configuration units may employ signaling methods not yet contemplated. As will be apparent to a person of ordinary skill in the art, the elements of the ingress traffic management system 200 are intended to represent functions and an order of operations rather than physical entities.

Hereinafter, terminology is borrowed from the specification of IP Differentiated Services ("DiffServ", see Blake, S., et. al., "An Architecture for Differentiated Services", IETF Request for Comments (RFC) 2475, December 1998, which may be found at www.ietf.org). Such terminology includes "per-hop behavior", "per-hop scheduling" class and "drop precedence". As will be appreciated by the skilled reader, such terminology is not in wide use with respect to Ethernet service frames and may be defined similarly, with some differences. However, the terminology is used herein in place of more generic language, e.g., forwarding treatment, scheduling treatment, precedence, for the sake of clarity. To accentuate the difference herein, an "E" will be used to distinguish an Ethernet per-hop behavior (E-PHB) from an IP DiffServ per-hop behavior (PHB), an Ethernet per-hop scheduling class (E-PSC) from IP DiffServ per-hop scheduling class (PSC), etc.

In operation of the ingress traffic management system 200 of FIG. 2, the ingress traffic management system 200 initially receives an Ethernet service frame, in one case from the first CE 106A over the first UNI 110XA. Traffic management information about the received Ethernet service frame may be determined by the classifier 202. The traffic management information may include an Ethernet service class and an E-PHB, from which may be determined an E-PSC and a color to associate with the Ethernet service frame. An Ethernet service class may be defined such that all Ethernet service frames associated with a given Ethernet service class receive identical forwarding treatment and policing treatment. A service provider may, for instance, offer three Ethernet service classes (e.g., Gold, Silver, Bronze).

Where policing of the Ethernet service frame is required, a Bandwidth Profile is required to be associated with the Ethernet service frame. An identity of a Bandwidth Profile to be used when policing the Ethernet service frame may be determined based on the E-PSC. The policer 204 may then determine compliance of the Ethernet service frame to the identified Bandwidth Profile and may, based on the determined compliance, replace the color previously associated with the Ethernet service frame with a new color.

Without regard to whether the color has been replaced, at the marker 206, the E-PSC and the color associated with the Ethernet service frame after processing by the policer 204 may be used to determine a forwarding treatment to associate with the Ethernet service frame in the provider network 102. The marker 206 may then generate an indication of the forwarding treatment. The forwarding treatment may be indicated in a system parameter and may be used by the PE 104 for determining how to schedule and whether to discard the service frame. Optionally, the indicated forwarding treatment may be used by the provider network 102. Optionally, the marker 206 may also mark/re-mark the header of the Ethernet service frame to indicate the forwarding treatment to subsequent nodes and/or networks. The latter marking may involve manipulating the p-bits. The marker 206 may also set the p-bits based on the IP DSCP. The mapper 208 may relate the protocols used in the provider network 102 to the protocol used in the first customer network 108A. In particular, the forwarding treatment of the Ethernet service frame indicated by the marker 206 may be mapped to a core forwarding treatment (a forwarding treatment in the provider network 102). The Ethernet service frame may then be marked by the mapper 208 with the core forwarding treatment based on the stored mapping between E-PHB and the nodal forwarding queues. The forwarder 210 may then transmit the Ethernet service frame to a node in the provider network 102.

Alternatively, where the first PE 104A performs a switching function, the forwarder 210 may transmit the Ethernet service frame to the fourth CE 106Z in the first customer network 108A of FIG. 1.

To determine the traffic management information, it may be necessary for the classifier 202 to determine an identity of an Ethernet virtual connection (EVC-ID) to associate with the Ethernet service frame. An Ethernet service class may be determined based on the EVC-ID and the traffic management information derived based on knowledge of the Ethernet service class.

To determine the EVC-ID, it may be necessary for the classifier 202 to determine the identity of the port on which the Ethernet service frame was received. The classifier 202 may also determine, from the IEEE 802.1Q tag of the Ethernet service frame, a VLAN-ID to associate with the Ethernet service frame. The EVC-ID may then be determined based on a combination of port identity and the VLAN-ID.

Alternatively, determining the EVC-ID may be based on a source Medium Access Control (MAC) address and/or a destination MAC address indicated in the header of the Ethernet service frame. Additionally, the EVC-ID may be determined based on a combination of the source and destination MAC address and the VLAN-ID.

It should be clear that the hereinbefore-described determination of the EVC-ID includes scenarios wherein a single EVC-ID is associated with a group of MAC source and/or destination addresses, or wherein a single EVC-ID is associated with a group of VLAN IDs.

Determining the frame E-PHB may then be based, at least in part, on the EVC-ID. Additionally or alternatively, determining the frame E-PHB may be based on frame information in the Ethernet service frame related to any of the seven Open System Interconnect (OSI) layers. Common OSI layer frame information may be determined from the p-bits in the IEEE 802.1Q tag or the IP Differentiated Services Code Point (DSCP) fields. Other frame information may be used, such as information found in the Ethernet Canonical Format Indicator (CFI) field in the IEEE 802.1Q tag, the VLAN-ID, the Ethernet protocol type, the IP source and/or destination addresses, the IP protocol type, the Transmission Control Protocol (TCP) port number or the User Datagram Protocol (UDP) port number.

To determine an identity of a Bandwidth Profile to associate with an Ethernet service frame, the classifier 202 may use a service class map, which associates each known Ethernet service class with frame E-PHBs and E-PSCs. An exemplary service class map 300 is illustrated in FIG. 3. Based on the Ethernet service class then, the classifier 202 may determine a frame E-PHB and an E-PSC for the Ethernet service frame. The classifier 202 may then determine the identity of a Bandwidth Profile for the Ethernet service frame, where the determining is based on an association, in the selected service class map, with the determined E-PSC.

In the exemplary service class map 300, eight E-PHBs are identified as EF, AF41, AF42, AF31, AF32, AF21, AF22 and DF. Such identifications should be familiar to the skilled reader as being related to "Expedited Forwarding" (EF), "Assured Forwarding" (AF) and "Default Forwarding" (DF) as used in IP DiffServ. Expedited Forwarding is described in Davie, B., et al., "An Expedited Forwarding PHB (Per-Hop Behavior)", IETF RFC 3246, March 2002, and Assured Forwarding is described in Heinanen, J., et al., "Assured Forwarding PHB Group", IETF RFC 2597, June 1999 (see www.ietf.org).

The Expedited Forwarding (EF) E-PHB may be considered suitable for Ethernet service frames related to services that require frames to be delivered within tight delay and loss bounds. Reordering of the Ethernet service frames is not allowed.

The Assured Forwarding (AF) E-PHB generally defines N classes, with each of the N classes having M discard priorities (drop precedence). E-AFik means E-AF class i and drop precedence k, where 1<=i<=N and 1<=k<=M. Reordering of the Ethernet service frames is not allowed within a class.

The Default Forwarding (DF) E-PHB may be considered suitable for Ethernet service frames related to services with no performance guarantees, e.g., best effort. Reordering of the Ethernet service frames is not allowed.

A first alternative exemplary service class map 400 is illustrated in FIG. 4 and a second alternative exemplary service class map 500 is illustrated in FIG. 5. As illustrated in comparing the first alternative exemplary service class map 400 and the second alternative exemplary service class map 500, different E-PSCs may be associated with the same or different Bandwidth Profiles. The selection of a particular service class map may be based on the EVC-ID of the Ethernet service frame, the identity of the UNI over which the Ethernet service frame is received, the PE at which the Ethernet service frame is received or the provider network 102 at which the Ethernet service frame is received.

The classifier 202 may also determine a color to associate with a received Ethernet service frame. Such a determination may be, for instance, based on the frame E-PHB determined for the received Ethernet service frame (i.e., E-EF and E-AF31 correspond to green, E-AF32 and DF correspond to yellow and E-AF33 corresponds to red). The color associated with a given Ethernet service frame may determine treatment of the given Ethernet service frame at the policer 204.

For the purposes of the herein-proposed enhancements to MEN E-LAN Services, each EVC is considered to be a bidirectional, multipoint-to-multipoint connection. As such, there is a possibility that the Bandwidth Profiles and CoS support at the various UNIs of the EVC may not be identical. An EVC can be associated with one or more Bandwidth Profiles and with one or more forwarding treatments (E-PHBs). Three types of EVCs may be defined from Quality of Service (QoS) perspective:

A single service class EVC having one Bandwidth Profile and a single forwarding treatment for all Ethernet service frames;

A multi-service-class EVC having one Bandwidth Profile and multiple forwarding treatments for the Ethernet service frames; and A multi-service-class EVC having multiple Bandwidth Profiles and multiple forwarding treatments for the Ethernet service frames.

The Bandwidth Profile is feature of the control plane 240 (see FIG. 2) used for resource reservation and allocation, admission control and traffic policing. The E-PHB is a feature of the data plane 230 (see FIG. 2) that is used to indicate a forwarding treatment for a given Ethernet service frame.

The Bandwidth Profile and forwarding treatment do not have a one-to-one mapping in the herein-presented model in that Ethernet service frames with different E-PHBs may be associated with the same Bandwidth Profile or may be associated with separate Bandwidth Profiles in a flexible manner.

Multiple EVCs may share a UNI 110, which may be used for multiple E-Line and/or E-LAN services. This provides the advantages of service flexibility, bandwidth sharing and reduced access cost. Notably, a multipoint-to-multipoint EVC Bandwidth Profile does not provide breakdown of bandwidth between the different PEs 104 or different sites. Network engineering is required to determine the total EVC bandwidth based on individual site-to-site traffic, and to dimension the core network resources accordingly.

In common operation, the classifier 202 receives an Ethernet service frame, determines an EVC-ID to associate with the Ethernet service frame and determines a E-PHB (forwarding treatment) to associate with the Ethernet service frame.

As discussed hereinbefore, the EVC-ID may be determined based on the identity of a port on which the Ethernet service frame was received, based on the identity of the port in combination with a VLAN-ID determined for the Ethernet service frame, based on a MAC address identified in the header of the Ethernet service frame or based on the MAC address in combination with a VLAN-ID determined for the Ethernet service frame. Notably, an EVC with a given EVC-ID may carry Ethernet service frames associated with multiple VLAN-IDs. Additionally, the MAC address may include source and destination MAC addresses, source MAC address only or destination MAC address only. Multiple MAC addresses (with possible wild cards/ranges) may be classified together within the same EVC-ID.

As discussed hereinbefore, the E-PHB may be determined based on p-bits, IP DSCP or VLAN-ID.

Five useful combinations of Ethernet service frame information that may be used by the classifier 202 when classifying incoming Ethernet service frames are as follows:

1. VLAN-ID+p-bits;
2. VLAN-ID+IP DSCP (only if Ethernet payload is IP, and DSCP is set properly);
3. Port+p-bits (called priority-tagged. The 802.1Q tag is present but VLAN-ID is not used);
4. VLAN-ID+VLAN-ID (for example, three VLAN-IDs may be associated with a single customer, carrying Gold, Silver and Bronze traffic, and grouped into a single EVC-ID); and
5. Port+DSCP (applicable to both tagged and untagged Ethernet interfaces. VLANs are not used).

While an identity of a Bandwidth Profile may be determined by the classifier 202, the identity is used at the policer 204 to select the corresponding Bandwidth Profile and process the Ethernet service frame according to traffic parameters specified in the identified Bandwidth Profile. The specification of traffic parameters for a given Bandwidth Profile is accomplished by the profile configuration unit 220 (see FIG. 2).

In operation, the policer 204 determines compliance of a received Ethernet service frame to an identified Bandwidth Profile and generates an indication of the compliance of the Ethernet service frame to the identified Bandwidth Profile. Depending on a mode of operation of the ingress traffic management system 200 (e.g., color-aware, color-blind, to be discussed hereinafter) the color associated with a received Ethernet service frame may determine the action taken by the policer 204.

The actions taken by the policer 204 may include, if the Ethernet service frame is determined not to be compliant with the bandwidth profile, dropping the Ethernet service frame, that is, actively determining that the Ethernet service frame is not to be forwarded to its intended destination. The actions taken by the policer 204 may also include, if the Ethernet service frame is determined not to be compliant with the Bandwidth Profile, merely generating an indication of the lack of compliance so that the marker 206 may take related action. Such an indication of the lack of compliance may be a replacement of the color associated with the Ethernet service frame in a manner well known in the art.

Based on the color associated with an Ethernet service frame after processing by the policer 204 and the E-PSC associated with the Ethernet service frame by the classifier 202, the marker 206 may determine a new forwarding treatment, more specifically, often an E-PHB, to associate with the Ethernet service frame.

Where policing is not required for an Ethernet service frame, the marker 206 may associate a forwarding treatment with the Ethernet service frame based on a frame E-PHB determined by the classifier 202. Such forwarding treatment indication may involve writing an indication of the forwarding treatment in a memory location associated with the Ethernet service frame.

There may be circumstances, as predetermined by an agreement between a customer an operator of the provider network 102, in which the Ethernet service frame is to be manipulated based on determinations of the ingress traffic management system 200. Such manipulation may be performed at the marker 206.

It should be clear that, under many circumstances, the Ethernet service frame is to be transported through the service provider network 102 transparently, i.e., without manipulation of the contents. Such service may be named transparent service or preservation mode.

The protocol in use in the provider network 102 may allow the definition of connections that incorporate a type of core forwarding treatment. As such, according to a mapped correspondence between the Ethernet service class and a particular core forwarding treatment, the particular core forwarding treatment may be selected for a received Ethernet service frame based on the determined Ethernet service class. Once selected, the Ethernet service frame, more particularly, whatever protocol data unit that is carrying the received Ethernet service frame, may be marked by the mapper 208 with an indication of the particular core forwarding treatment.

As will be understood by a person of ordinary skill in this art, the provider network 102 may operate according to a protocol that is "connection-oriented" or "connection-less". When a connection is defined through the provider network 102, the connection may be a connection in a connection-oriented network (e.g., an ATM virtual connection) or an analogy to a connection in a connection-less network (e.g., a tunnel in an IP network).

As discussed hereinbefore, the protocol in use in the provider network 102 may be one of Ethernet, ATM, MPLS, FR, IP and SONET/SDH. As such, the forwarder 210 may appropriately prepare the Ethernet service frame for transmission over the provider network 102. Such appropriate preparation may include encapsulating the Ethernet service frame in a protocol data unit of a type defined for the particular core protocol before transmitting the Ethernet service frame to a node in the provider network 102.

To transmit the Ethernet service frame to a node in the provider network 102 the forwarder 210 may select a candidate scheduling queue based on the E-PSC associated with the Ethernet service frame and transmit the Ethernet service frame to the candidate scheduling queue.

Furthermore a connection in the core (provider network 102) may be selected, by the forwarder 210 according to an association with an Ethernet service class, as defined for the particular protocol in use in the core. The determined Ethernet service class may indicate a particular suitability of the selected core connection to satisfy the traffic parameters of the Ethernet service frame.

Thus far, the determination of an Ethernet service class to associate with a given Ethernet service frame has been discussed, and the derivation of traffic management functions from the Ethernet service class. This method offers significant flexibility. Alternatively, QoS classes may be defined which combine several traffic management functions and define performance objectives for the given Ethernet service frame.

QoS classes have been defined for protocols, other than Metro Ethernet, for which traffic management is more thoroughly developed. As traffic management is developed for Metro Ethernet Networks, QoS classes may play a role in defining a set of parameters and behaviors for use in traffic management in Metro Ethernet Networks. Notably, the previously described functions performed by the classifier 202 (using the Ethernet header and/or OSI Layer protocol information) are still performed when determining a treatment for the Ethernet service frame according to QoS Class.

In operation, the ingress traffic management system 200 stores definitions of several QoS classes. When an Ethernet service frame is received, a QoS class is selected for the Ethernet service frame by the classifier 202. Selecting the QoS class to associate with a received Ethernet service frame may be based on the classification of the Ethernet service frame in a manner similar to the methods described for determining an Ethernet service class to associate with a received Ethernet service frame. For example, the QoS class may be selected based on the EVC-ID determined for a particular Ethernet service frame. More often, the QoS class may be selected based on the EVC-ID together with information in the Ethernet service frame related to any of the seven Open System Interconnect (OSI) layers. Traffic parameter types and ranges (CIR, EIR, CBS, EBS) may then be associated with the Ethernet service frame, based on the selected QoS class. Similarly, compliance rules and performance targets (frame delay, frame delay variation, frame loss) may be associated with the Ethernet service frame, based on the selected QoS class. An access forwarding treatment may also be determined for the Ethernet service frame, based on the selected QoS class. The Ethernet service frame may then be processed by the ingress traffic management system 200 according to the information defined within the QoS class.

A number of standardized QoS classes may be predefined for a given PE 104. Additionally, a service provider may be provided with an opportunity to define additional QoS classes to suit specific requirements. Such additional classes may simply be modified versions of the standard QoS classes.

Several suggested QoS classes are defined in FIGS. 6-9.

Figure 6:
FIG. 6 illustrates a definition for a "Constant Rate" QoS class according to an embodiment of the present invention.

FIG. 6 illustrates a definition 600 for a "Constant Rate" QoS class. The definition 600 for the Constant Rate QoS class specifies performance targets as lowest frame delay available, lowest frame delay variation available and lowest frame loss available, specifies traffic parameters as a positive committed information rate, a positive committed burst size, a zero excess information rate and a zero excess burst size and specifies a compliance rule to indicate that non-compliant frames are to be dropped.

FIG. 7 illustrates a definition 700 for a "Variable Rate (Real-Time)" QoS class. The definition 700 for the Variable Rate (Real-Time) QoS class specifies performance targets as low frame delay available, low frame delay variation available and low frame loss, specifies traffic parameters as a positive committed information rate, a positive committed burst size, a positive excess information rate and a positive excess burst size and specifies a compliance rule to indicate that non-compliant frames are to be admitted up to the excess information rate and excess frames are to be assigned a high drop precedence.

FIG. 8 illustrates a definition 800 for a "Variable Rate (Non-Real-Time)" QoS class. The definition 800 for the Variable Rate (Non-Real-Time) QoS class specifies a performance target as low frame loss, specifies traffic parameters as a positive committed information rate, a positive committed burst size, a positive excess information rate and a positive excess burst size and specifies a compliance rule to indicate that non-compliant frames are to be admitted up to the excess information rate and excess frames are to be assigned a high drop precedence.

FIG. 9 illustrates a definition 900 for a "Best Effort" QoS class. The definition 900 for the Best Effort QoS class does not specify hard QoS guarantees, specifies traffic parameters as a zero committed information rate, a zero committed burst size, a large, positive excess information rate and a positive excess burst size and specifies a compliance rule to indicate that all admitted frames are to be assigned a high drop precedence.

Now that various aspects of the operation of the classifier 202 have been considered, attention may be turned to the aspects of operation of the policer 204.

Typical policing algorithms generally allow for color-aware and color-blind operation. In color-aware operation, a color that is associated with a received Ethernet service frame by the classifier 202 is considered at the policer 204 when determining compliance with a given Bandwidth Profile. In color-blind operation, a color that is associated with a received Ethernet service frame may be ignored when determining compliance with a given Bandwidth Profile. That is, each Ethernet service frame may be policed equally.

At the classifier 202, the E-PHB and color of a received Ethernet service frame may be determined, based on service definitions, rules and pre-existing CE markings on the received Ethernet service frame.

In a first mode of color-blind operation, CE marking (e.g., p-bits or IP DSCP) is ignored. The classifier 202, working in this first mode, assigns all incoming Ethernet service frames (per EVC or per UNI) the same color. For example, the classifier 202 may assign all received Ethernet service frames the color green or yellow. The classifier 202 may also assign all received Ethernet service frames the same E-PHB. The first mode of color-blind operation may be found to be of particular use where a PE is connected to a CE across non-trusted domain boundaries, e.g., when the CE markings cannot be trusted, either because of provider policy or inadequate CE marking capability.

In a second mode of color-blind operation, user drop precedence marking is ignored and scheduling treatment marking is respected. For example, the classifier 202 may assign incoming Ethernet service frames (per EVC or per UNI) that are marked by the user as E-AF31, E-AF32, E-AF33 or E-AF41, E-AF42, the green color. The classifier 202 allows the Ethernet service frames to maintain the indicated E-PHBs. As such, compliance may be measured per scheduling class, independent of the user drop precedence marking (the k in "AFik"), which may have significance only within the user network. This second mode of color-blind operation is similar to the known ATM VBR.1 service that ignores the user CLP marking when determining conformance.

In a third mode of color-blind operation, which is similar to the second mode of color-blind operation, the ingress traffic management system 200 overrides the drop precedence indication of the packets according to the assigned color. For example, the classifier 202 may assign the color green to an incoming Ethernet service frame marked by the user with the E-AF42 marking. Subsequently, the marker 206 may change the marking to E-AF41, based on the assignment of the green color. In an opposite case, the classifier 202 may assign the color yellow to an incoming Ethernet service frame marked by the user with the E-AF41 marking. Subsequently, the marker 206 may change the marking to E-AF42, based on the assignment of the yellow color. The third mode of color-blind operation has the drawback of altering the original user marking of Ethernet service frames, but the third mode of color-blind operation may be seen as useful in some networking scenarios, for example, for indicating a drop precedence to the downstream nodes. This third mode of color-blind operation is somewhat similar to the ATM "forced tagging" feature when all incoming UBR user cells are tagged CLP1 to indicate low importance.

In color-aware operation, the classifier 202 assigns different colors to the Ethernet service frames, depending on incoming Ethernet service frames designation and the classification rules. For example, Ethernet service frames marked E-AF31 may be assigned the green color, Ethernet service frames marked E-AF32 may be assigned the yellow color and Ethernet service frames marked E-AF33 may be assigned the red color. Color-aware operation is suitable between trusted administrative domains. A common example of a trusted administrative domain may be found where a CE is managed by the provider.

An E-LAN Service type may support service multiplexing of EVCs at none, one or more of the UNIs. For example, an E-LAN Service type (using multipoint-to-multipoint EVCs) and an E-Line Service type (using point-to-point EVCs) may be service multiplexed at the same UNI. In this example, the E-LAN Service type may be used to interconnect customer sites while the E-Line Service type is used to connect customer sites to the Internet, with both services offered via EVC service multiplexing at the same UNI.

Figure 10:
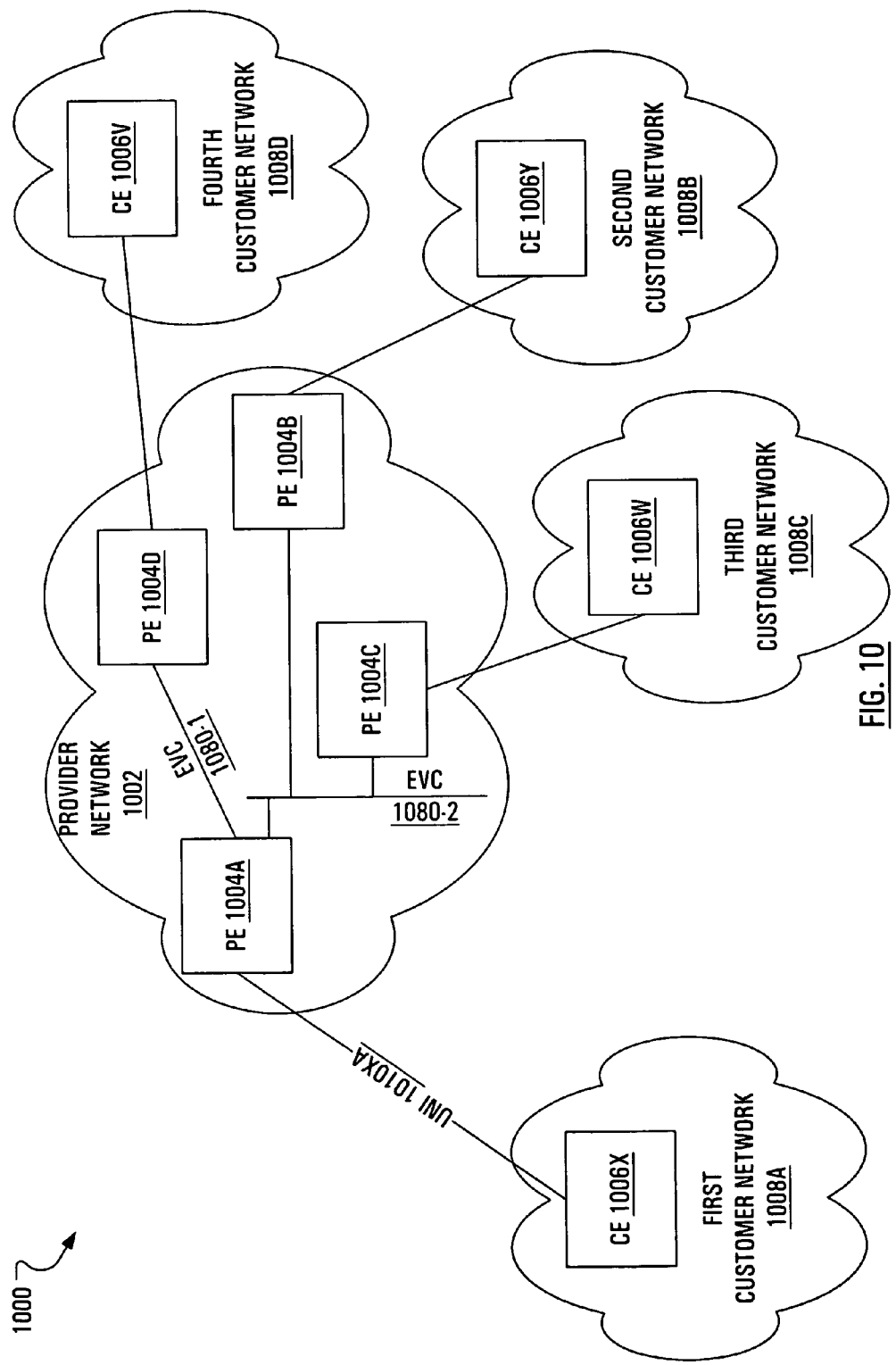
FIG. 10 illustrates an exemplary network wherein the provider network supports both an E-Line Ethernet virtual connection and an E-LAN Ethernet virtual connection according to an embodiment of the present invention.

FIG. 10 illustrates an exemplary network 1000 including a provider network 1002 and four, of potentially many, customer networks. The customer networks are named, as a first customer network 1008A, a second customer network 1008B, a third customer network 1008C and a fourth customer network 1008D. The provider network 1002 may include multiple PEs including a first PE 1004A, a second PE 1004B, a third PE 1004C and a fourth PE 1004D (collectively or individually 1004). The first customer network 1008A includes a first CE 1006X, while the second customer network 1008B includes a second CE 1006Y, the third customer network 1008C includes a third CE 1006W and the fourth customer network 1008C includes a fourth CE 1006Z. Additionally, a first UNI 1010XA is illustrated connecting the first CE 1006X to the first PE 1004A.

FIG. 10 logically illustrates two EVCs within the provider network 1002, a first (point-to-point) EVC 1080-1 and a second (multipoint-to-multipoint) EVC 1080-2. Notably, the two EVCs 1080-1, 1080-2 share the first UNI 1010XA.

Hereinbefore, the classifier 202 has classified (e.g., determined a service class for) a received Ethernet service frame based on a determined EVC-ID. Alternatively, the classifier 202 may classify a received Ethernet service frame based on the identity of the UNI over which the Ethernet service frame is received. In such a UNI-based classification embodiment, the architecture of the ingress traffic management system 200 is unchanged. Classification performed at the classifier 202 may include determining service classes and/or QoS classes. The key difference between the UNI-based classification embodiment and the EVC-based classification embodiment is that the context for all traffic management functions is the UNI rather than the EVC. The classification, service class/QoS class, Bandwidth Profiles, service class maps, etc., are all applicable to the whole UNI rather than being applicable per EVC.

Determining the frame E-PHB may be based on frame information in the Ethernet service frame related to any of the seven OSI layers. Common OSI layer frame information may be determined from the p-bits in the IEEE 802.1Q tag or the IP DSCP fields. Other frame information may be used, such as information found in the Ethernet CFI field in the IEEE 802.1Q tag, the VLAN-ID, the Ethernet protocol type, the IP source and/or destination addresses, the IP protocol type, the TCP port number or the UDP port number.

The determination of the identity of the Bandwidth Profile to use at the policer 204 may be based on a per-UNI service class map which associates an Ethernet service class with an E-PSC and a bandwidth profile-ID. Different E-PSCs may be associated with the same or different bandwidth profile-ID, similar to the per-EVC example presented hereinbefore.

In one implementation, Ethernet service frames received over a given UNI are associated with the same Ethernet service class and are policed according to a single Bandwidth Profile.

In another implementation, each Ethernet service frame received over a given UNI may be associated with one of multiple Ethernet service classes but is policed according to a single Bandwidth Profile. The Ethernet service classes of the Ethernet service frames may be determined based on the p-bits, or DSCP, etc. Up to eight Ethernet service classes may be determined based on the p-bits, and up to 64 Ethernet service classes may be determined based on the DSCP.

In a further implementation, each Ethernet service frame received over a given UNI may be associated with one of multiple Ethernet service classes and is policed according to one of multiple Bandwidth Profiles. The Ethernet service classes of the Ethernet service frames may be determined based on the p-bits, or DSCP, etc. The Bandwidth Profile may be assigned based on a service class map (e.g., combining one or more p-bits or IP DSCPs). The number of Bandwidth Profiles can be the same or smaller than the number of the PSCs.

Figure 11:
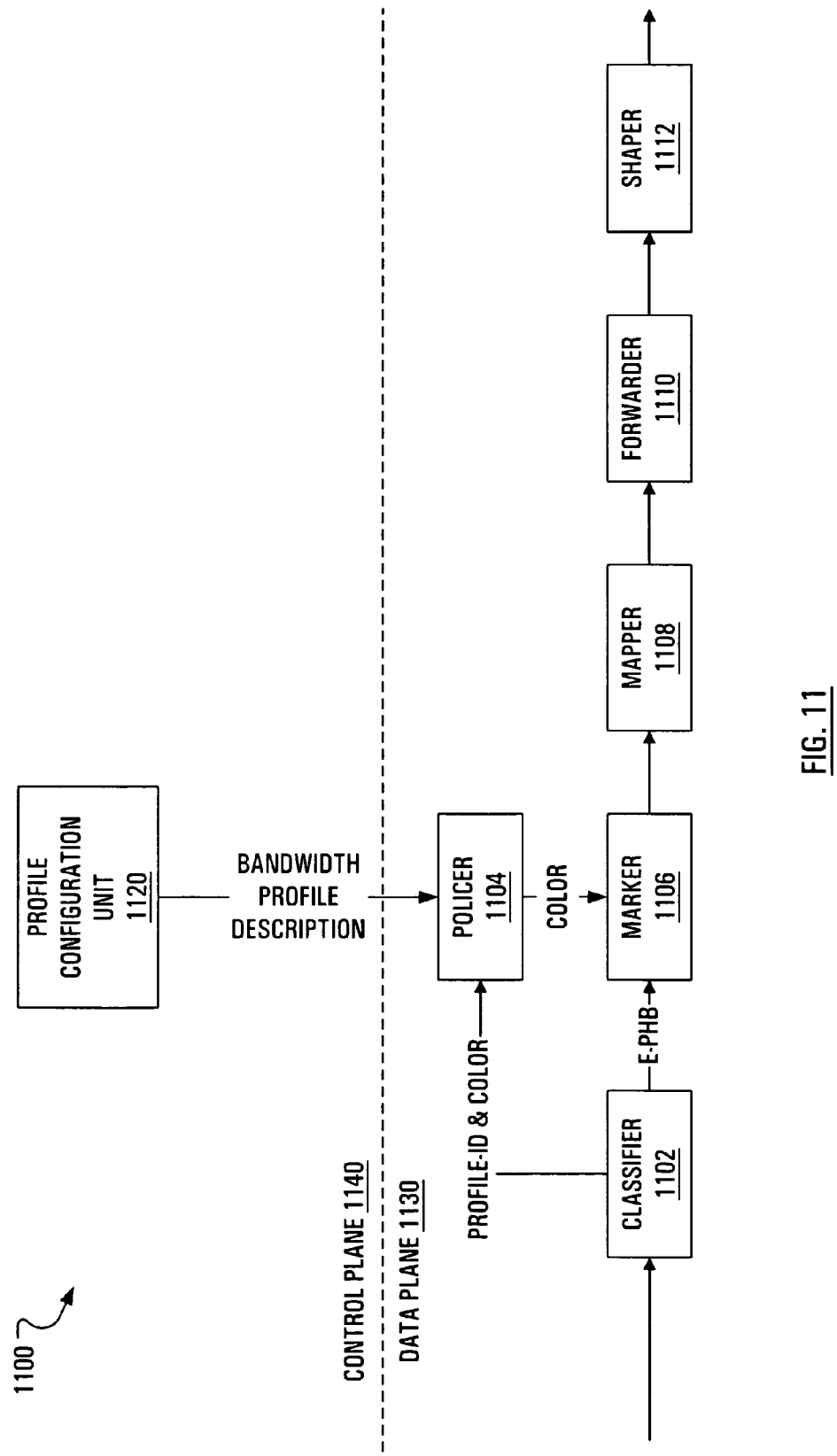
FIG. 11 illustrates a logical architecture for an egress traffic management system for provider edge equipment in the provider network of FIG. 1 according to an embodiment of the present invention.

Thus far, only the ingress traffic management system 200 and the CE-PE direction has been considered. However, there may be reasons for performing traffic management functions at the egress PE in the PE-CE direction. An egress traffic management system 1100 is illustrated in FIG. 11 as divided into a control plane 1140 and a data plane 1130. The data plane 1130 includes many elements familiar from the data plane 230 of FIG. 2, including the classifier 202, the policer 204, the marker 206, the mapper 208 and the forwarder 210, and a new element, namely, a shaper 1112. The control plane 1140 includes a policing configuration unit 1120. As will be apparent to a person of ordinary skill in the art, the elements of the egress traffic management system 1100 are intended to represent functions and an order of operations rather than physical entities.

In operation, the handling of an Ethernet service frame by the egress traffic management system 1100 (at, say, the second PE 104B) very closely parallels the handling of an Ethernet service frame by the ingress traffic management system 200 (at, say, the first PE 104A). The handling begins with the receipt of the Ethernet service frame from a node in a Metro Ethernet Network (including, say, the provider network 102 of FIG. 1). Traffic management information about the received Ethernet service frame may be determined by the classifier 1102. The traffic management information may include an Ethernet service class and an E-PHB (forwarding treatment), from which may be determined an E-PSC, an identity of a Bandwidth Profile and a color to associate with the Ethernet service frame. The classifier 1102 may then generate an indication of the identity of the Bandwidth Profile and forwarding treatment for reference by other elements of the egress traffic management system 1100. After processing by the elements of the egress traffic management system 1100, the Ethernet service frame is transmitted to customer edge equipment over a UNI by the forwarder 1108.

Similar to the case for the ingress traffic management system 200, the determining of the Ethernet service class for a given Ethernet service frame may be based on the identity of the user-network interface (UNI-ID) over which the given Ethernet service frame is to be transmitted or on the identity of an Ethernet virtual connection (EVC-ID) associated with the given Ethernet service frame. Alternatively, the Ethernet service class determination may be based on the EVC-ID or egress UNI-ID in combination with any of the OSI protocol layer information including the p-bits, IP DSCP and VLAN-ID, etc. Once the Ethernet service class is determined, many traffic management parameters may then be derived for the Ethernet service frame, such as a Bandwidth Profile, an E-PHB and an E-PSC.

The policer 1104 may determine whether the Ethernet service frame is compliant with the Bandwidth Profile. Subsequently, the marker 1106 may, where the Ethernet service frame is determined not to be compliant with the Bandwidth Profile, indicate a forwarding treatment for the Ethernet service frame that takes into account a lack of compliance. Ethernet service frames determined not to be compliant with the Bandwidth Profile may, instead, simply be dropped.

This application of compliance rules may be seen as particularly useful when applied based on the identity of a multipoint-to-multipoint EVC or a QoS associated with an identified UNI to limit the total volume incoming traffic from multiple sources when service multiplexing is employed (multiple EVCs per UNI).

A traffic shaping function may be seen to limit and smooth the traffic to the CE. Similar to policing, the traffic shaping function may be applied per UNI, per EVC, per UNI service class/QoS class or per EVC service class/QoS class. The applicants have found the traffic shaping function to be particularly beneficial for multipoint-to-multipoint EVC and for UNI-based QoS to limit the traffic arriving from multiple EVCs.

The shaping function carried out by the shaper 1112 is, conceptually, the last stage. Ethernet service frames forwarded on an egress link may be spaced out (and queued, if necessary) the shaper 1112 before being transmitted on the egress link. The shaper 1112 may be "linear", using a single rate, or the shaper 1112 may use a more complex function, such as executed by "dual-rate bursty shaper" to match the policing parameters (e.g., CIR, CBS, EIR, EBS) of a downstream node/network.

The mapper 1116 may alter the header of the Ethernet service frame to suit requirements of the destination customer network that includes the second CE 106Y. In particular, altering the header may involve removing the core/tunnel header and/or altering user priority bits in an IEEE 802.1Q tag. The predetermined rate may be selected based on the identity of the UNI or the identity of an Ethernet virtual connection to associate with the Ethernet service frame.

Egress traffic management may provide an opportunity for translation between Ethernet service classes used in the provider network 102 and the second customer network 108B. Where the received Ethernet service frame is associated with a first Ethernet service class, handling the Ethernet service frame may involve selecting an indication of a second service class from a set of indications to be used at the customer edge equipment and altering the Ethernet service frame to include the indication of the second service class. The indication of a service class may be understood to be the E-PHB, however marked on an Ethernet service frame. Such a translation may allow for a mapping of multiple E-PHBs in the provider network 102 to a fewer number of E-PHBs in the second customer network 108B. Alternatively, such a translation may allow for a mapping, with some additional information, of a fewer number of E-PHBs in the provider network 102 to multiple E-PHBs in the second customer network 108B.

Figure 12:
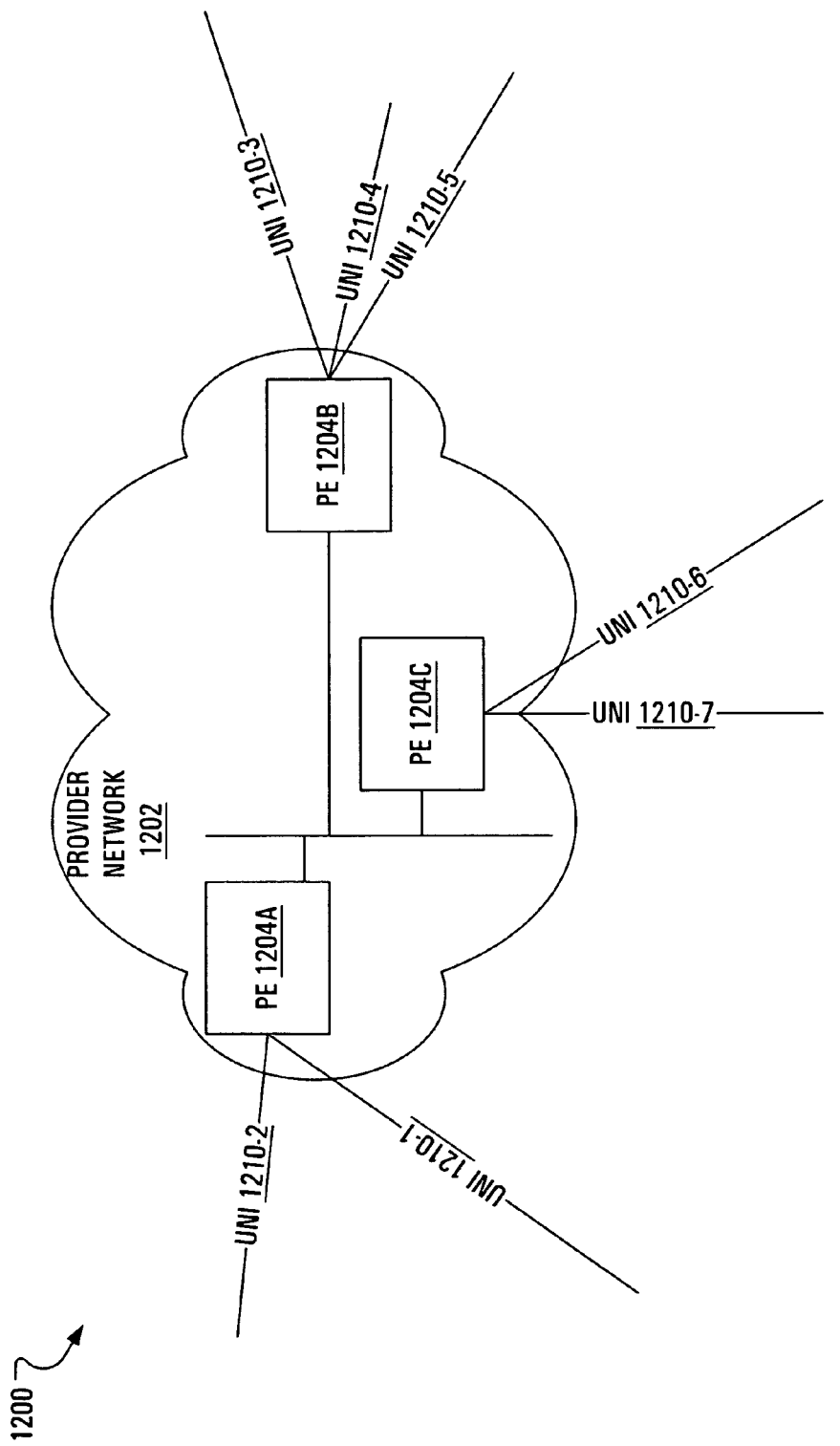
FIG. 12 illustrates a provider network including provider equipment supporting multiple User-to-Network Interfaces according to an embodiment of the present invention.

FIG. 12 illustrates an exemplary network 1200 including a provider network 1202. The provider network 1202, as illustrated, includes multiple PEs including a first PE 1204A, a second PE 1204B and a third PE 1204C (collectively or individually 1204). The first PE 1204A is illustrated as supporting a first UNI 1210-1 and a second UNI 1210-2. Similarly, the second PE 1204B is illustrated as supporting a third UNI 1210-1, a fourth UNI 1210-4 and a fifth UNI 1210-5, and the third PE 1204A is illustrated as supporting a sixth UNI 1210-6 and a seventh UNI 1210-7. The UNIs 1210-1, 1210-2, 1210-3, 1210-4, 1210-5, 1210-6, 1210-7 may be collectively or individually referred to as 1210.

An MEF multipoint-to-multipoint EVC set up within the exemplary network 1200 of FIG. 12 may include a single UNI 1210 or multiple UNIs 1210 per PE 1204, where the UNIs 1210 associated with the multipoint-to-multipoint EVC at a given PE 1204 belong to the same customer. The MEF QoS functions may rely on the selection of a Bandwidth Profile based on the identity of a given UNI or on the combination of the identity of a given UNI with identity of a given EVC. Additionally, the selection of a Bandwidth Profile for a received Ethernet service frame may be based on the identity of an EVC associated with the received Ethernet service frame or based on the identity of an EVC service class associated with the received Ethernet service frame, where the EVC connects multiple UNIs 1210 at a given PE 1204 belonging to the same E-LAN (e.g., the first UNI 1210-1 and the second UNI 1210-2).

The capability of specifying a Bandwidth Profile for a multipoint-to-multipoint EVC is useful for the case when a customer has multiple CEs connected to the same PE 1204. The advantages include simplified configuration and increased network scalability due to the use of fewer traffic contracts. This capability also benefits the customer by allowing dynamic sharing of bandwidth across the multiple UNIs 1210.

Other CoS functions, such as service maps, may be also specified per UNI, UNI/EVC, or PE/EVC.

The applicant has recognized a motivation for using multiple multipoint-to-multipoint EVCs between a given source CE and a given destination CE, herein called an "EVC Group". The use of EVC Groups can have several benefits, by providing resiliency in case of failure and allowing for incremental growth.

Figure 13:
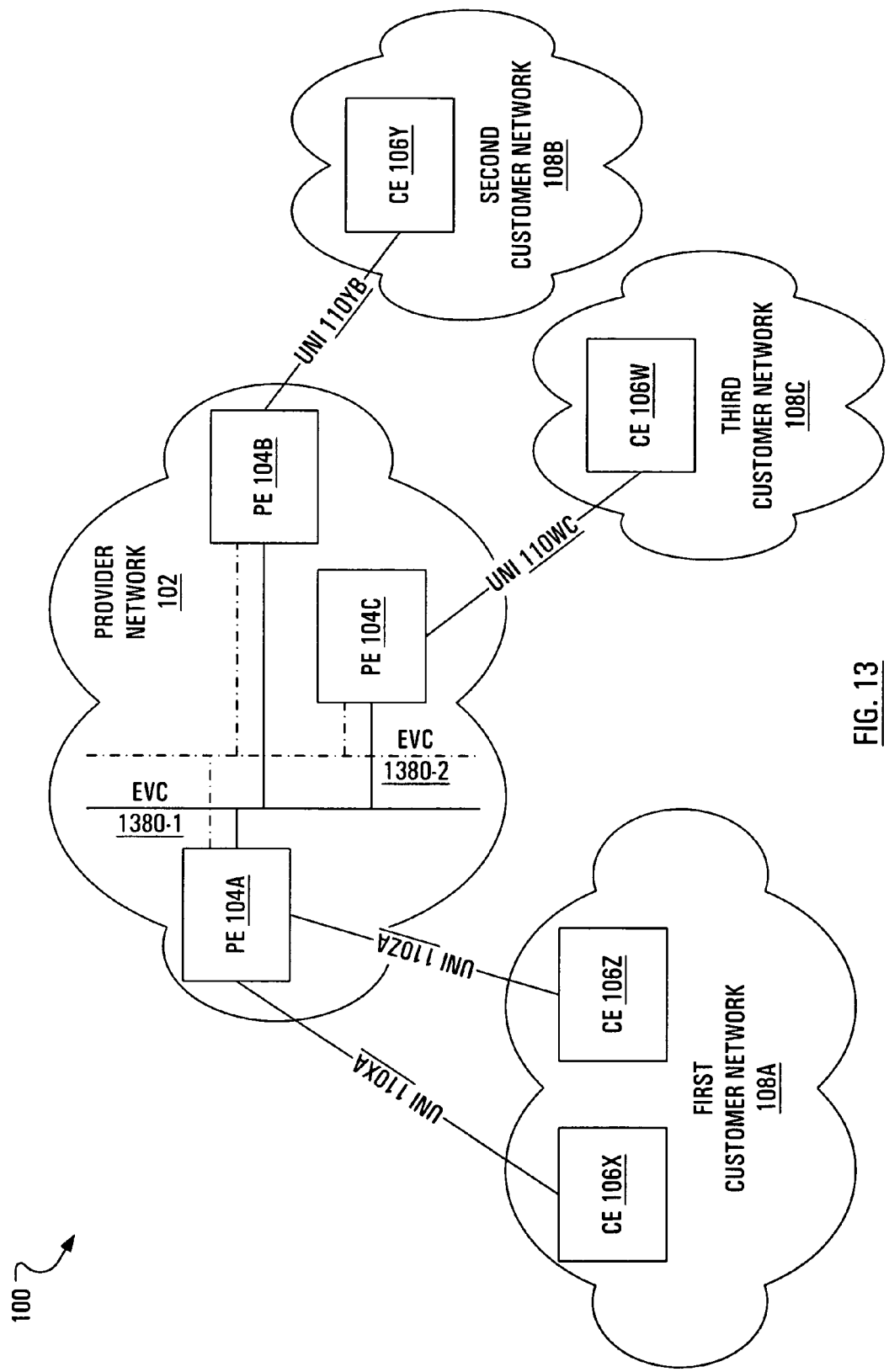
FIG. 13 illustrates the network of FIG. 1 wherein two multipoint-to-multipoint Ethernet virtual connections have been set up in the provider network according to an embodiment of the present invention.

In FIG. 13, the exemplary network 100 of FIG. 1 has been illustrated including two multipoint-to-multipoint EVCs, namely a first multipoint-to-multipoint EVC 1380-1 and a second multipoint-to-multipoint EVC 1380-2.

In operation, the first multipoint-to-multipoint EVC 1380-1 may be established between the first UNI 110XA, the second UNI 110YB and the third UNI 110WC. Subsequently, the second multipoint-to-multipoint EVC 1380-2 may be established between the first UNI 110XA, the second UNI 110YB and the third UNI 110WC. A first EVC group may then be defined to include the first multipoint-to-multipoint EVC 1380-1 and the second multipoint-to-multipoint EVC 1380-2. More particularly, the multipoint-to-multipoint EVCs in the first EVC group may be configured to have the same performance characteristics (frame delay variation, frame delay, frame loss ratio).

The Bandwidth Profile may then be specified per EVC Group, instead of per multipoint-to-multipoint EVC, for scalability and simplicity. Furthermore, the multipoint-to-multipoint EVCs in a given EVC Group may be configured to carry the same mix of service class traffic. In one example of this, the EVC group may be configured such that each multipoint-to-multipoint EVC carries a predetermined mix of Gold, Silver and Bronze service class traffic. In another example, each multipoint-to-multipoint EVC within a given EVC Group may be configured such that different service class types are carried on different multipoint-to-multipoint EVCs, that is, the first multipoint-to-multipoint EVC 1380-1 carries Gold traffic while the second multipoint-to-multipoint EVC 1380-2 carries Silver and Bronze traffic. Each method may be shown to offer advantages in some networking scenarios, in terms of resiliency, sharing, cost, etc.

Load balancing techniques may be used when multiple multipoint-to-multipoint EVCs can carry the incoming traffic, without introducing re-ordering of the frames within an Ethernet service class. In one technique, attempts are made to equalize the absolute (measured) or relative (measured and expressed as a percentage of a maximum) load of the various multipoint-to-multipoint EVCs in an EVC Group. This may be achieved by a variety of means such as distributing Ethernet sessions across the EVCs using hashing methods, bandwidth reservations, or equalization of the measured utilization of each EVC.

In general, an EVC Group-ID may be determined for a received Ethernet service frame. A multipoint-to-multipoint EVC may then be selected from among the plurality of multipoint-to-multipoint EVCs in the EVC group so that the Ethernet service frame may be transmitted over the selected multipoint-to-multipoint EVC. Once the EVC Group-ID has been established, a service class and a Bandwidth Profile may be determined. The selection of the multipoint-to-multipoint EVC may be accomplished after determining an Ethernet service class for the received Ethernet service frame. In the event of a failure in one multipoint-to-multipoint EVC in an EVC Group, the failed multipoint-to-multipoint EVC may be excluded from being selected to accept traffic associated with the EVC Group-ID.

The use of Metro Ethernet Networks is not limited to a single service provider. As illustrated in an exemplary network 1400 in FIG. 14, four networks of a first service provider, namely a first access provider network 1408A, a second access provider network 1408B, a third access provider network 1408C and a fourth access provider network 1408D are interposed by a core provider network 1402. The first access provider network 1408A supports a first UNI 1410-1 and a second UNI 1410-2. The second access provider network 1408B supports a third UNI 1410-3 and a fourth UNI 1410-4. The third access provider network 1408C supports a fifth UNI 1410-4 and a sixth UNI 1410-6. The fourth access provider network 1408D supports a seventh UNI 1410-7 and an eighth UNI 1410-8. The first access provider network 1408A connects to a first PE 1404A in the core provider network 1402 over a first network-network interface (NNI) 1412A. The second access provider network 1408B connects to a second PE 1404B in the core provider network 1402 over a second NNI 1412B. The third access provider network 1408C connects to a third PE 1404C in the core provider network 1402 over a third network-network interface (NNI) 1412C. The fourth access provider network 1408B connects to a fourth PE 1404B in the core provider network 1402 over a fourth NNI 1412D. The four PEs 1404A, 1404B, 1404C, 1404D are illustrated as connected with the core provider network 1404 by a multipoint-to-multipoint EVC 1480.

Most functions described herein for use over a UNI between customers and providers may be applied over a NNI between a first provider and a second provider, including classification, policing, marking and forwarding. Furthermore, traffic management functions may be carried out per EVC, per UNI, per service class or QoS class, and may involve ingress and/or egress traffic management functions.

Figure 14:
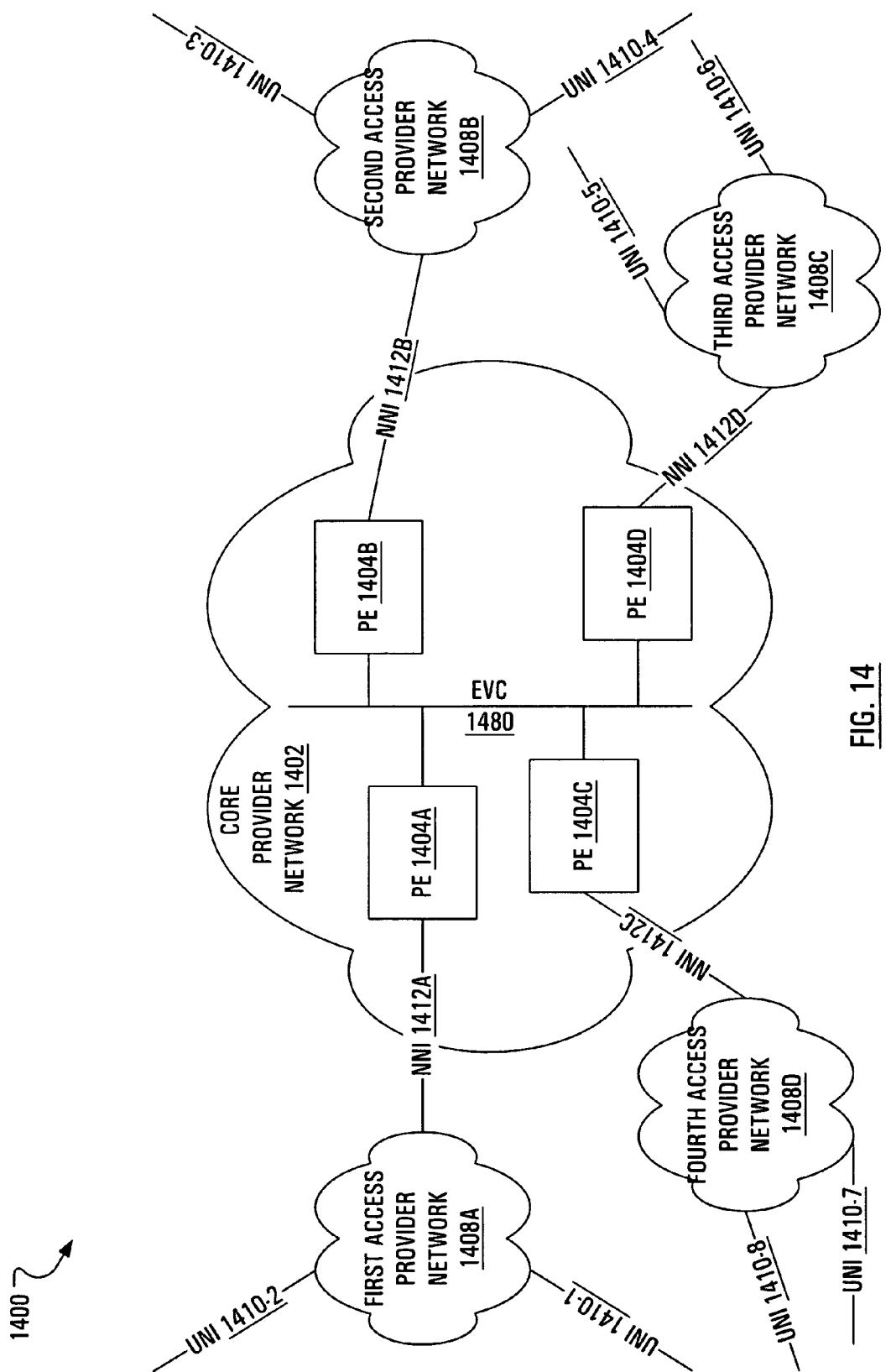
FIG. 14 illustrates four networks of a first service provider in communication over network-network interfaces with an interposed core provider network according to an embodiment of the present invention.

The Access-Core MENs model of FIG. 14 is very similar to the UNI model of FIG. 1. The core provider network 1402 of FIG. 14 acts as the provider network 102 of FIG. 1 and the first access provider network 1408A acts as the first customer network 108A of FIG. 1.

Traffic management parameters may be specified for the entire first NNI 1412A or per EVC within the core provider network 1402, and may be specified for single or multiple classes of service as described hereinbefore.

The traffic across the first NNI 1412A and the second NNI 1412B may include original connections (EVCs) and CE frames. More typically, the traffic across the NNI is aggregate traffic related to multiple end-users (CEs). Aggregation and Tunneling techniques may be used to multiplex/de-multiplex the end-users' traffic.

We will now turn our attention to servicing the frame inside the provider core network. An EVC may be transported in the provider network 102 (FIG. 1) using different methods, depending on provider network technology and required QoS. In connection-oriented provider networks, such as ATM, Frame Relay, MPLS, TDM (optical or circuit switching), an EVC can be mapped to one or more provider network connections that support single or multiple service classes each, although, it may be necessary to first estimate the EVC bandwidth between each pair of PEs. The EVC service class and Bandwidth Profiles may be mapped flexibly to connections in the provider network 102, using various aggregation and mapping methods.

In connectionless networks, such as IP, legacy Ethernet, MPLS LDP protocol, bandwidth reservation is not possible, but the Ethernet service class indicators of the Ethernet service frame can be mapped to IP DiffServ, p-bits, etc. for different forwarding treatment.

In operation, at the PE 104A of FIG. 1, an access service class may be determined for an Ethernet service frame received over the first UNI 110XA. A provider network connection may be selected based on the determined access service class. The selecting may involve consulting a mapping of access service classes to provider network service classes. The Ethernet service frame may then be encapsulated in a protocol data unit used in the provider network 102. The header of the encapsulating protocol data unit may then be marked to include the determined provider network service class indication. Subsequently, the provider network protocol data unit may be transmitted on the provider network connection. Notably, the provider network connection may be configured to carry more than one EVC.

Typically, a tunneling technology is employed in the provider network 102, where a tunnel header is appended to each Ethernet service frame, and used for forwarding the Ethernet service frame in the provider network 102. Although not necessary, this method has several advantages, including independence between the customer networks 108 and the provider network 102, an ability to preserve the original Ethernet service frame header and service class indicators, and the ability of multiplexing many services and connections on the provider network 102 (for scalability and operations simplification).

Example tunneling techniques include Ethernet MAC-in-MAC or Q-in-Q, IETF PWE3 pseudo wires, MPLS label switched paths, IP tunnels, ATM and Frame Relay connections, etc. As will be understood, proprietary tunneling techniques may also be used.

At the classifier 202 of the ingress traffic management system 200 of FIG. 2, mapping a service class associated with a received Ethernet service frame to the corresponding service class indication in the provider network 102 may involve a simple 1:1 mapping when the customer network 108 and the provider network 102 support the same forwarding treatments. More often, mapping is needed to translate customer-specific (access) service classes to the core service classes offered by the service provider. For example, the customer network 108 may use eight or more service classes to meet the enterprise needs, while the provider (or the service purchased from the provider) provides three or four service classes, such as Platinum, Gold, Silver and Bronze.

At the mapper 208, the encapsulating header of a given Ethernet service frame may be manipulated for efficient DiffServ-style forwarding within the provider network 102. Such manipulating may involve setting the Ethernet p-bits, MPLS EXP bits, or IP tunnel DSCP bits. Such manipulating may also include the setting of a discard priority and congestion indications in the encapsulating header.

At the forwarder 210, the Ethernet service frame may be forwarded onto the chosen connection or scheduling queue that meets the class performance objectives.

As will be understood, in a common case, multiple E-LANs/EVCs may map to the same core tunnel (e.g., an MPLS LSP). In such a case, there is no one-to-one correspondence between traffic parameters of the EVC connections and the LSP connections. However, traffic parameters mapping methods, which are described above for the non-multiplexing case, can help with the Connection Admission Control and network engineering functions when multiple E-LANs/EVCs are multiplexed on the same core tunnel.

Hierarchical Connection Admission Control (CAC) is typically performed for setting up an LSP tunnel on a given link between the two PEs and then for admitting EVCs onto the LSP. The LSP is set-up first with enough bandwidth to accommodate the total anticipated Ethernet traffic between the two PEs. A "transport" admission control function is typically performed for admitting the LSP on the link, where the link may be physical or logical. The "equivalent bandwidth" of the LSP is then determined. This equivalent bandwidth provides a "virtual pipe capacity" that may be used for admitting Ethernet connections when setting up an EVC. Subsequently, the CAC function may be executed for admitting the Ethernet connections on the LSP. The equivalent bandwidth of the Ethernet connection may be determined from traffic parameters of the Ethernet connection, overhead conversion, required CoS (typically frame loss ratio), the virtual pipe capacity of the LSP, and the capacity of the underlying link. Further details of the CAC functions are beyond the scope of this invention.

When supporting multiple PE-to-PE tunnels/LSPs, an extension (another step) may be required. In such an extension, the bandwidth management function may account for each service class per-LSP separately. This may be accomplished either based on EVC service class bandwidth profiles or, if the Bandwidth Profile is not broken down per service class, based on an estimate of the Bandwidth Profile for each LSP.

It is notable that discussions of VPLS commonly assume that the core network employs MPLS. A VPLS typically consists of transport tunnel LSPs between the PEs and a pseudo wire mesh between the PEs participating in each L2

VPLS VPN, where the transport tunnel LSPs are set up on a Packet Switched Network (PSN).

The CoS functions follow the general principles described earlier. The transport tunnels may be set-up with bandwidth reservation using the RSVP-TE protocol (see Awduche, et al, "RSVP-TE: Extensions to RSVP for LSP Tunnels," IETF RFC 3209, December 2001, which may be found at www.ietf.org). An estimate of the PE-to-PE bandwidth may be required to dimension the MPLS tunnels. The tunnels may include E-LSPs with multiple CoS/PSC support, or a group of L-LSPs each supporting a single core service class/PSC. The pseudo wires may be mapped to the transport tunnels, where the mapping delivers the required CoS (including the scheduling treatment and sufficient bandwidth) in the MPLS core. The scheduling treatment may be provided by mapping the Ethernet service frame E-PHB (scheduling treatment) to a corresponding (or better) core PHB (scheduling treatment). The mapping is facilitated by the fact that MPLS already supports DiffServ classes and shares a large degree of similarity with VLAN QoS methods. Multiple access PHBs may be combined in fewer core PHBs, if sufficient resources are configured.

For bandwidth reservation, the volume/percentage of PE-to-PE traffic may be estimated for each E-LAN (multipoint-to-multipoint) EVC. Subsequently, a service edge CAC function may be performed for admitting pseudo wires within the tunnel. The trigger for admitting pseudo wires within the tunnel may be the receipt of configuration information or signaling. Configuration information may, for instance, include operation commands issued by an operator or by a script. The mapping of bandwidth requirements between the EVC UNI bandwidth parameters and the MPLS core may take into consideration overhead calculations and an Ethernet-to-MPLS traffic parameter conversion. If multiple service classes are supported, the bandwidth may be estimated for each service class (depending on EVC Bandwidth Profile and MPLS tunnel type).

The VPLS architecture supports the case wherein the Attachment Circuits (ACs) use networking protocols other than Ethernet, e.g., ATM, FR, PPP, MPLS, etc.). The CE may be directly linked to the PE, or may connect to the PE using a Metro Ethernet Network, an access network such as an ATM access network or a FR Access Network. The core network may use Ethernet pseudo wires, or attachment circuit-type pseudo wires such as ATM pseudo wires or FR pseudo wires, over MPLS as described previously. For a more complete discussion of Ethernet-to-FR Network Interworking and Ethernet-to-ATM Network Interworking, see U.S. Patent Provisional Application Ser. No. 60/537,487, filed Jan. 20, 2004 and the corresponding regular US Patent Application, filed Nov. 17, 2004.

Functionally, the CE-PE pair may perform network interworking functions, e.g., handling Ethernet over ATM or Ethernet over FR. For instance, where an attachment circuit connects a CE to an ingress PE over an ATM access network, the CE may perform network interworking functions to transmit an Ethernet service frame over the ATM access network to the ingress PE using known Ethernet over ATM methods. At the ingress PE, the ATM connection may be terminated. Such termination may, for instance, involve the extraction of an Ethernet service frame from received ATM cells. More generally, an Ethernet service frame may be extracted from a protocol data unit used by the access network.

Additionally, the ingress PE may perform mapping of parameters in the access network to CoS in the core to implement the following functions: a Bandwidth Estimation function, which may be based on either an attachment circuit payload traffic descriptor or an Ethernet payload traffic descriptor, depending on the service definition (notably an estimate of the VPLS PE-to-PE bandwidth requirements may then be required in a determination of dimensions for the pseudo wires and protocol overhead may be included in the determination); and a Core Forwarding/data plane function, which may use the Ethernet frame indicators, but may, optionally, use indications of the attachment circuit CoS, which may useful in some cases, e.g., untagged Ethernet frames arriving on a CBR ATM VCC.

Mapping to core CoS may alternatively be based on ATM UNI Service Category, ATM traffic parameters such as Peak Cell Rate, Sustainable Cell Rate and Maximum Burst Size, or ATM cell indicators such as Cell Loss Priority, Explicit Forward Congestion Indicator. Further alternatively, service parameters associated with the Ethernet service frame may be used, if specified. Such service parameters may include Ethernet bandwidth, Ethernet service frame CoS indicators, etc. In a third alternative, a selection of core CoS may be based on a combination of ATM traffic parameters and Ethernet service parameters. For example, a first mapping may be used to associate specific pseudo wires with ATM traffic/bandwidth parameters, while a second mapping is used to map Ethernet service frame CoS indicators (such as VLAN-ID, p-bits) to core service classes. As should be clear, that which applies above to ATM access networks may also apply equivalently to FR access networks.

Once mapping of parameters in the access network to CoS in the core has been performed, the core CoS may be indicated in MPLS transport and service tunnel headers to guide the forwarding of the Ethernet service frame through the core network. Alternately, the Ethernet service frame CoS may be used for selecting the core connection type or the QoS required in the core network. Typically the original Ethernet service frame is not altered. However, altering of the Ethernet service frame may be available as an option.

Furthermore, the egress PE may perform mapping of CoS in the MPLS core to CE in the access network to implement the following functions: a Bandwidth Estimation function, which may use an estimate of Ethernet PE-to-CE traffic, which can be determined from summing the ingress bandwidth estimates and may account for attachment circuit overhead; and a forwarding/data plane function, which would normally use the Ethernet frame indicators, but may also use the MPLS CoS indicators, e.g., the EXP values or L-LSP PSC. Notably, the egress PE mapping from MPLS core toward the CE may use Ethernet-aware FR/ATM for supporting multiple CoS on a single connection.

Core network CoS may be mapped, at the egress PE, to attachment circuit QoS. Optionally, Core network CoS may be mapped to CoS indicators used in Ethernet over ATM or Ethernet over FR as specified in U.S. patent application Ser. No. 10/744,000 filed Dec. 23, 2003 and U.S. patent application Ser. No. 10/744,001 filed Dec. 23, 2003 by the Applicant. In such a case, multiple priority queues could be used for a single ATM/FR connection, with queue selection based on Ethernet service frame indicators, such as p-bits.

As stated above, the core network may use Ethernet pseudo wires, or attachment circuit-type pseudo wires such as ATM pseudo wires or FR pseudo wires. The performance of a network interworking function at a PE in a core that employs Ethernet pseudo wires and terminates an attachment circuit using ATM, for example, has been discussed. However, the PE may also perform a network interworking function in a scenario wherein the CE has a direct Ethernet connection with the PE and the core employs attachment circuit-type pseudo wires. Where the attachment circuit-type pseudo wires are, for instance, ATM pseudo wires, the network interworking function performed at the PE acts to encapsulate received Ethernet service frames using a known Ethernet over ATM protocol for transmission through the core on an ATM pseudo wire.

In another scenario, the access network is an ATM network and the core employs ATM pseudo wires. In this scenario, the PE need not perform a network interworking function. However, an Ethernet-based CE may be required to perform a network interworking function to encapsulate Ethernet service frames in ATM cells for transmission on the ATM access network.

Other modifications will be apparent to those skilled in the art and, therefore, the invention is defined in the claims.

We claim:

1. A traffic management system for a first provider edge node, said first provider edge node having a first User-Network Interface, in a provider network operating according to a Local Area Network Service comprising:
a classifier adapted to:
determine an identity of a multipoint-to-multipoint Ethernet Virtual Connection to associate with a received Ethernet service frame, said multipoint-to-multipoint Ethernet Virtual Connection associating said first User-Network Interface with at least a second User-Network Interface;
determine, based on the identity of the Ethernet Virtual Connection, a service class for the received Ethernet service frame;
a marker adapted to:
select, based on said service class, a forwarding treatment; and
associate said forwarding treatment with said received Ethernet service frame; and
a forwarder adapted to:
determine, based on said forwarding treatment, how to schedule transmission of said received Ethernet service frame; and
transmit said received Ethernet service frame, over the multipoint-to-multipoint Ethernet Virtual Connection, to a node in said provider network.

2. The traffic management system of claim 1 wherein said classifier is adapted to determine said identity of said Ethernet Virtual Connection based on information in a header of said Ethernet service frame.

3. The traffic management system of claim 1 wherein said service class is associated with a policing treatment for said Ethernet service frame.

4. The traffic management system of claim 1 wherein said classifier is further adapted to determine, based on said service class, an identity of a Bandwidth Profile to associate with said received Ethernet service frame.

5. The traffic management system of claim 1 wherein said Local Area Network Service is a Metro Ethernet Network Ethernet Local Area Network Service.

6. The traffic management system of claim 1 wherein said Local Area Network Service is a Virtual Private Local Area Network Service.

7. A traffic management method comprising:
determining, at a first provider edge node in a provider network, said first provider edge node having a first User-Network Interface, an identity of a multipoint-to-multipoint Ethernet Virtual Connection to associate with a received Ethernet service frame, said multipoint-to-multipoint Ethernet Virtual Connection associating said first User-Network Interface with at least a second User-Network Interface;
determining, at said first provider edge node and based on the identity of the Ethernet Virtual Connection, a service class for the received Ethernet service frame;
selecting, at said first provider edge node and based on an indication of said service class, a forwarding treatment;
associating said forwarding treatment with said received Ethernet service frame;
determining, at said first provider edge node and based on said forwarding treatment, how to schedule transmission of said received Ethernet service frame;
and
transmitting, from said first provider edge node to a node in said provider network, said received Ethernet service frame over said multipoint-to-multipoint Ethernet Virtual Connection.

8. The method of claim 7 further comprising:
determining an access scheduling treatment to associate with said received Ethernet service frame;
selecting a candidate core scheduling treatment, based on said access scheduling treatment;
selecting a candidate transport tunnel in said provider network based on said candidate core scheduling treatment; and
wherein said transmitting said received Ethernet service frame over said multipoint-to-multipoint Ethernet Virtual Connection includes transmitting said received Ethernet service frame on said candidate transport tunnel.

9. The method of claim 8 wherein said provider network is a Multiprotocol label switching network.

10. The method of claim 9 further comprising setting up said candidate transport tunnel using a resource reservation protocol with traffic engineering.

11. The method of claim 9 further comprising setting up said candidate transport tunnel using a label distribution protocol.

12. The method of claim 9 wherein said candidate transport tunnel terminates at a destination provider edge node and wherein said first provider edge node and said destination provider edge node are connected as part of a mesh of pseudo wires.

13. The method of claim 12 further comprising:
determining an estimate of a bandwidth requirement for traffic between said first provider edge node and said destination provider edge node; and
setting up said candidate transport tunnel to have a dimension sufficient to accommodate said estimate of said bandwidth requirement.

14. The method of claim 12 wherein said pseudo wires are Ethernet pseudo wires.

15. The method of claim 12 wherein said pseudo wires are Asynchronous Transfer Mode pseudo wires.

16. The method of claim 12 wherein said pseudo wires are Frame Relay pseudo wires.

17. The method of claim 7 further comprising:
determining an estimate of a bandwidth required between said first provider edge node in said provider network and a destination provider edge node in said provider network for said multipoint-to-multipoint Ethernet Virtual Connection;
establishing a tunnel in said provider network, where said establishing is based, at least in part, on said estimate;
receiving a request to admit a pseudo wire within said tunnel; and
admitting said pseudo wire within said tunnel.

18. The method of claim 7 further comprising:

determining an access network class of service associated with said Ethernet service frame;

selecting, based on said access network class of service, a core network class of service;

marking said received Ethernet service frame with an indication of said core network class of service, thereby generating a marked Ethernet service frame; and where said transmitting said received Ethernet service frame over said multipoint-to-multipoint Ethernet Virtual Connection includes transmitting said marked Ethernet service frame over said provider network.

19. The method of claim 7 further comprising:

determining an identity of a Ethernet virtual connection group associated with said received Ethernet service frame, where said Ethernet virtual connection group associates a plurality of multipoint-to-multipoint Ethernet virtual connections; and selecting said multipoint-to-multipoint Ethernet Virtual Connection from among said plurality of multipoint-to-multipoint Ethernet virtual connections in said Ethernet virtual connection group.

20. The method of claim 7 further comprising:

selecting a candidate Quality of Service (QoS) class, from among a plurality of QoS classes, for said received Ethernet service frame;

determining a type and at least one limit for a traffic parameter for said received Ethernet service frame, based on said candidate QoS class;

determining a compliance rule for said received Ethernet service frame, based on said candidate QoS class;

determining a performance target for said received Ethernet service frame, based on said candidate QoS class; and servicing said received Ethernet service frame according to said type and said at least one limit for said traffic parameter, said performance target and said compliance rule.

* * * * *